United States Patent
Michinaga

(10) Patent No.: US 7,903,366 B2
(45) Date of Patent: Mar. 8, 2011

(54) WRITE-ONCE TYPE STORAGE APPARATUS, CONTROL CIRCUIT, AND CONTROL METHOD

(75) Inventor: Yamagishi Michinaga, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 71 days.

(21) Appl. No.: 12/506,947

(22) Filed: Jul. 21, 2009

(65) Prior Publication Data

US 2009/0310249 A1 Dec. 17, 2009

Related U.S. Application Data

(63) Continuation of application No. PCT/JP2007/055473, filed on Mar. 19, 2007.

(51) Int. Cl.
*G11B 5/596* (2006.01)
*G11B 20/20* (2006.01)

(52) U.S. Cl. ............ 360/77.02; 360/76; 360/77.04; 360/78.04

(58) Field of Classification Search .......... None
See application file for complete search history.

(56) References Cited

U.S. PATENT DOCUMENTS

| 6,421,197 B1 * | 7/2002 | Abdelnour | 360/77.02 |
| 6,483,658 B1 * | 11/2002 | Nguyen | 360/77.01 |
| 2007/0258165 A1 * | 11/2007 | Ahn et al. | 360/76 |

FOREIGN PATENT DOCUMENTS

| JP | A 2002-157850 | 5/2002 |
| JP | A 2004-95078 | 3/2004 |
| JP | A 2004-227735 | 8/2004 |

* cited by examiner

*Primary Examiner* — Andrew L Sniezek
(74) *Attorney, Agent, or Firm* — Greer, Burns & Crain, Ltd.

(57) ABSTRACT

A recording processing unit sets a track pitch narrower than a writing width of a recording element so that part of the recorded track overlapped with the unused track is overwritten, and continuously records information on a disk medium toward one direction in accordance with the track pitch. A first offset correcting unit reads a write/read offset from a storage table, in which the write/read offset is measured and saved in advance, and corrects the write/read offset in the state that a reading element is positioned at a target track. A second offset correcting unit corrects a write-once center offset, which is a positional deviation between a read center position of the reading element, which has undergone correction of the write/read offset by the first offset correcting unit, and a center position of an effective track width caused by write-once recording.

20 Claims, 20 Drawing Sheets

FIG. 3

| HEAD NUMBER | CYLINDER ADDRESS | WRITE/READ OFFSET | ONCE-WRITE CENTER OFFSET |
|---|---|---|---|
| HH01 | CC1 | $\alpha 1$ | $\beta 1$ |
| | CC2 | $\alpha 2$ | $\beta 2$ |
| | CC3 | $\alpha 3$ | $\beta 3$ |
| | ⋮ | ⋮ | ⋮ |
| | CCn | $\alpha n$ | $\beta n$ |
| HH02 | CC1 | $\alpha n+1$ | $\beta n+1$ |
| | CC2 | $\alpha n+2$ | $\beta n+2$ |
| | CC3 | $\alpha n+3$ | $\beta n+3$ |
| | ⋮ | ⋮ | ⋮ |
| | CCn | $\alpha 2n$ | $\beta 2n$ |
| HH03 | CC1 | $\alpha 2n+1$ | $\beta 2n+1$ |
| | CC2 | $\alpha 2n+2$ | $\beta 2n+2$ |
| | CC3 | $\alpha 2n+3$ | $\beta 2n+3$ |
| | ⋮ | ⋮ | ⋮ |
| | CCn | $\alpha 3n$ | $\beta 3n$ |
| HH04 | CC1 | $\alpha 3n+1$ | $\beta 3n+1$ |
| | CC2 | $\alpha 3n+2$ | $\beta 3n+2$ |
| | CC3 | $\alpha 3n+3$ | $\beta 3n+3$ |
| | ⋮ | ⋮ | ⋮ |
| | CCn | $\alpha 4n$ | $\beta 4n$ |

54

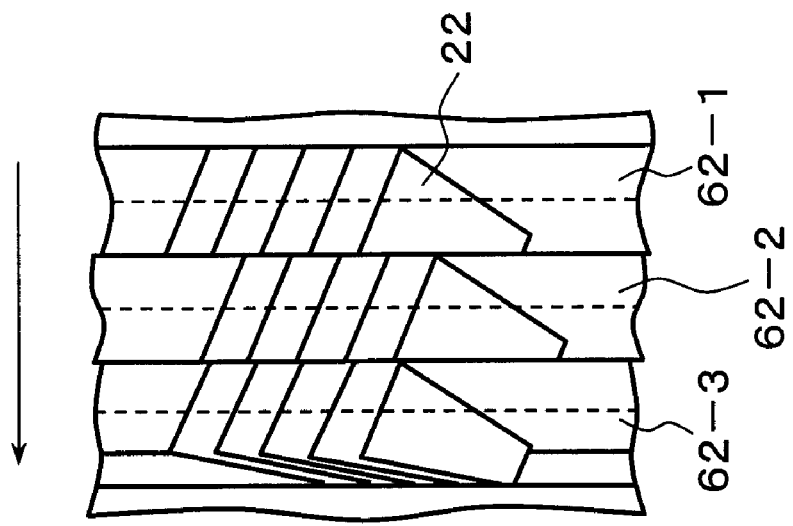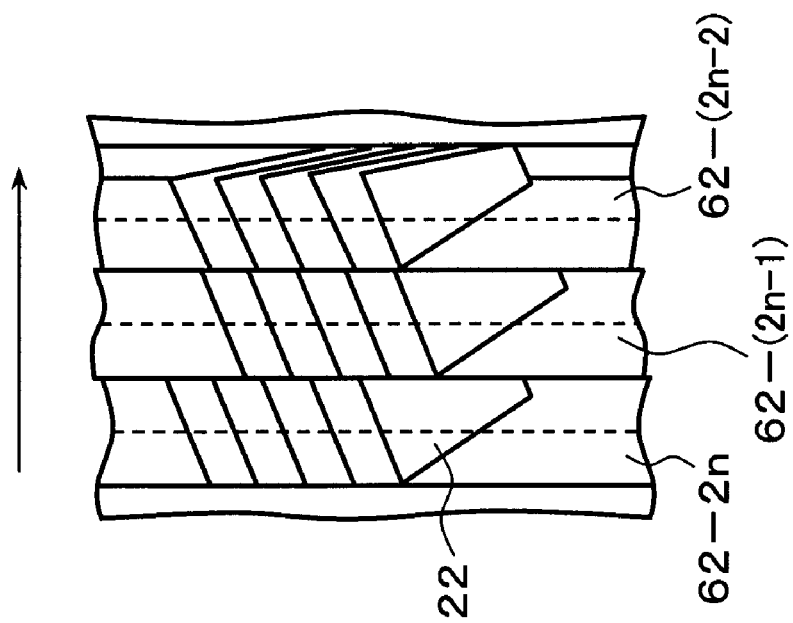

FIG. 17A
FIG. 17B
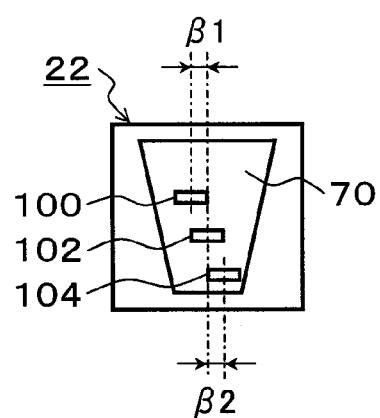
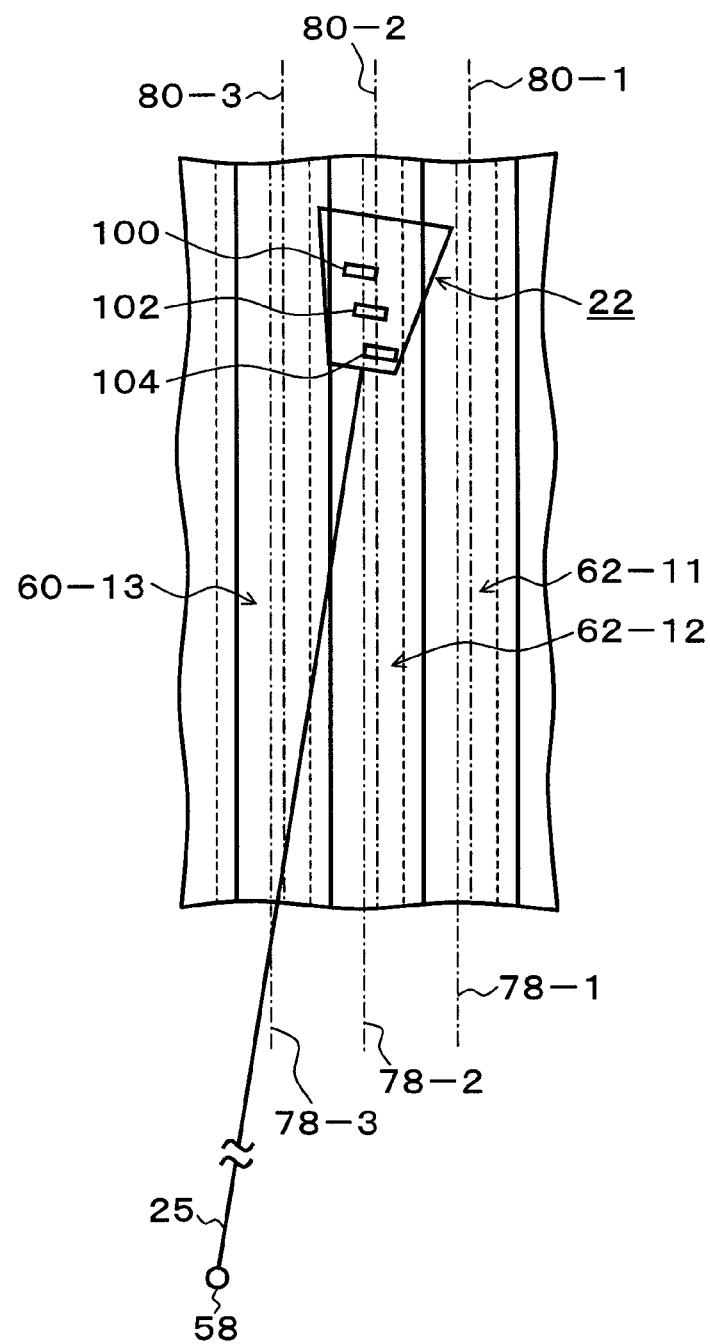

FIG. 19A
FIG. 19B
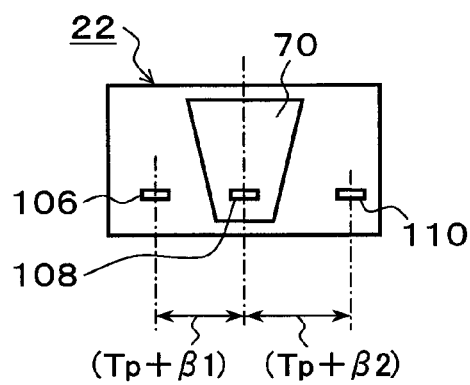
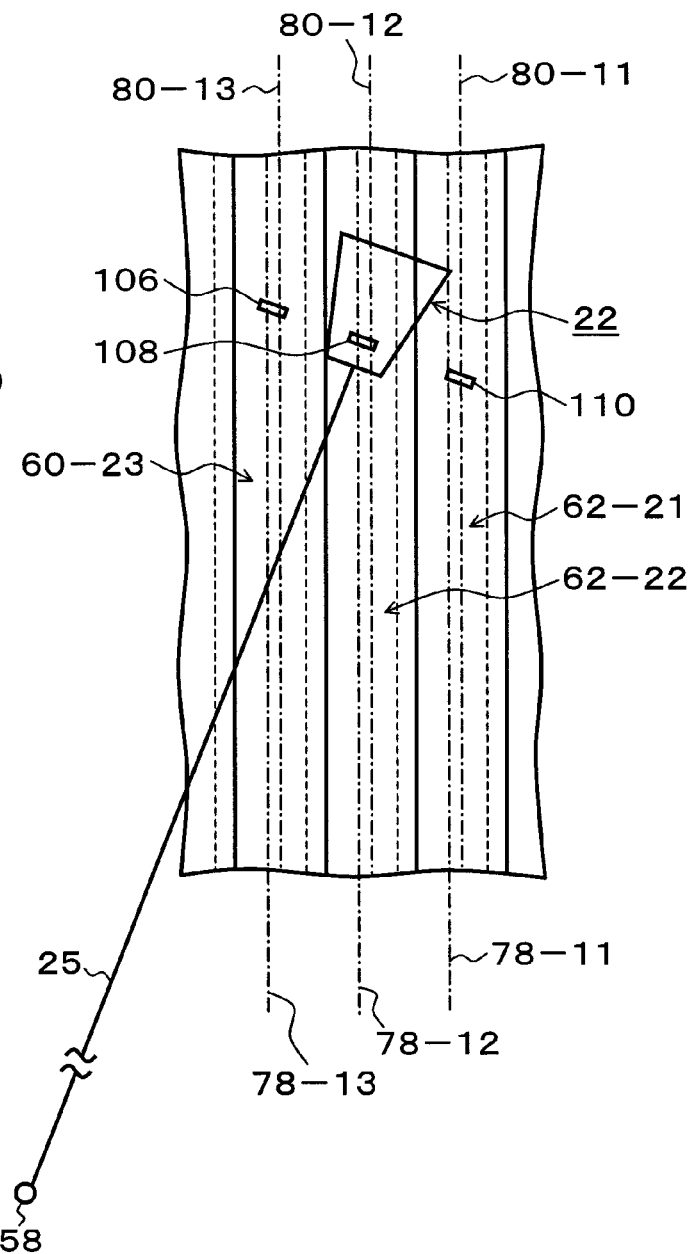

WRITE-ONCE TYPE STORAGE APPARATUS, CONTROL CIRCUIT, AND CONTROL METHOD

This application is a continuation of PCT/JP2007/055473 filed Mar. 19, 2007.

TECHNICAL FIELD

The present invention relates to a write-once type storage apparatus, a control circuit, and a control method for repeatedly reproducing information after once writing the information to a disk medium and particularly relates to a write-once type storage apparatus, a control circuit, and a control method for correcting offsets when the information recorded on the disk medium at a track pitch which is specific to write-once type recording and narrower than a recording head width is to be reproduced.

BACKGROUND ART

Conventionally, write-once type storage recording devices are for optical disk media such as DVDs, which are portable storage media. Generally, in an optical disk drive using an optical disk medium, a linear actuator which linearly drives an optical head in the transverse direction of the tracks of the medium is used as a head actuator. On the other hand, in a hard disk drive using a magnetic disk medium, a head is positioned with respect to the magnetic disk medium by using a rotary actuator, and information access to an arbitrary track position can be made randomly or continuously. Regarding such hard disk drives, those enabled usage of a portable storage medium by housing a magnetic disk medium in a cartridge are also known. Moreover, recently, the hard disk drives are used in various apparatuses and devices other than information devices along with capacity increase, downsizing, and cost reduction of the hard disk drives, and they are also utilized therein as write-once type storage apparatuss which write movies or music merely once and are then used only for reproduction like optical disk drives of, for example, DVDs. In the case of a conventional write-once type hard disk drive, the method of continuously carrying out write toward one direction to the inner side by using, for example, an outermost track as a starting track is employed as one writing process.
Patent Document 1: Japanese Patent Application Laid-Open (kokai) No. 2004-095078

However, in the continuous recording in the one direction in such a conventional write-once type storage apparatus, the track pitch is comparatively wide in consideration of inclination of the head caused along with increase of the yaw angle of the rotary actuator, and there is a problem that the surface recording density of the magnetic disk medium cannot be increased. More specifically, if the track pitch is determined from, for example, the head width at the position where the yaw angle is 0 degree without considering the inclination of the head caused by the yaw angle, the head is extended over the track width due to the inclination of the head at a head position in the outer or inner side where the yaw angle is increased. When write is carried out, an adjacent track is overwritten by the part extended out from the track width, the information recorded in the adjacent track is broken, the error rate thereof is lowered, and the information may become unreadable. In order to prevent this, the track width is comparatively wide so that interference with adjacent tracks does not occur due to increase of the yaw angle, and it is difficult to narrow the track pitch more than that so as to increase the surface recording density.

DISCLOSURE OF THE INVENTION

According to the present invention to provide a write-once type storage apparatus, a control circuit, and a control method capable of improving the reproduction performance by appropriately enabling offset correction of the reading element to a center position of an effective recorded track, which is narrower than the recording head width of write-once type recording that overwrites the overlapping part caused by continuous one-direction writing are provided.

In order to solve this problem and to enable increase of the surface recording density by narrowing the track pitch even when the yaw angle is varied by the rotary actuator, the present inventor has proposed a write-once type storage apparatus which continuously carries out one time of recording with respect to a disk medium from the track at which the yaw angle is the largest (outermost track or innermost track) toward the track at which the yaw angle is 0 degree. As a result, continuous one-direction write of overwriting the part that is overlapped upon write of the adjacent track is carried out even when the part overlapping the adjacent track is generated due to variation of the yaw angle, thereby increasing the track density by narrowing the track pitch and increasing the surface recording density of the disk medium.

Meanwhile, in recent write-once type storage apparatuss, a composite type head structure is employed in which a high-sensitive reproducing head utilizing, for example, the tunneling effect type magnetoresistance effect (TMR) is independent from a recording head.

In a head having such a structure, the positional deviation which is generated in a head manufacturing process between a recording element and a reading element cannot be completely eliminated. Therefore, the paths through which a recording head and a reading head pass when recording is carried out on a certain track are different from each other.

Therefore, the deviation amount is measured in advance as a write/read offset and stored in a control table, for example, in a manufacturing test step, the corresponding write/read offset is read from the control table when the head is positioned at a target track upon reproduction, and the head position of the target track is corrected to the position that is shifted by the amount of the write/read offset. As a result, the reading element is moved to the center of recording by the recording element so as to reproduce the target track.

However, in the case of the write-once type recording, since the continuous one-direction write of overwriting the part of an adjacent track overlapped upon write is carried out, even when the corresponding write/read offset is read and corrected at a target track position, the reading head cannot be positioned at the center position of the recorded track, and there is a problem that reproduction performance is lowered.

(Storage Apparatus)

The present invention provides a write-once type storage apparatus. The present invention is the write-once type storage apparatus which supports a head having a recording element and a reading element at a distal end of a rotary actuator and reproduces information after once continuously writing the information to a disk medium by the recording element, the write-once type storage apparatus comprising:

a recording processing unit, when write to an unused track adjacent to a recorded track is to be carried out, setting a track pitch narrower than a writing width of the recording element so that part of the recorded track overlapped with the unused track is overwritten and continuously recording the information on the disk medium toward one direction along with the track pitch;

a first offset correcting unit reading a write/read offset from a storage table set in advance and correcting the write/read offset in the state that the reading element is positioned at a target track, the write/read offset being positional deviation between the recording element and the reading element;

a second offset correcting unit correcting a write-once center offset β, the write-once center offset being positional deviation between the position of a read center of the reading element, which has undergone correction of the write/read offset α by the first offset correcting unit, and the position of an effective track width center of the write-once recording; and a reproduction processing unit reproducing the information of the disk medium by the reading element in the state that the write/read offset and the write-once center offset are corrected.

The second offset correcting unit obtains the write-once center offset β as $$\beta = \frac{Tw \cdot \cos\theta - Tp}{2} \quad (1)$$

based on a yaw angle θ of the rotary actuator corresponding to a position of the target track, a head recording width Tw of the recording element, and the track pitch Tp of the write-once recording and corrects the write-once center offset β.

In the write-once type storage apparatus of the present invention, the write-once center offset β is obtained as $$\beta = \frac{Tw \cdot \cos\theta - Tp}{2} \quad (2)$$

based on an yaw angle θ of the rotary actuator corresponding to a position of the target track, a head recording width Tw of the recording element, and the track pitch Tp of the write-once recording, the write-once center offset β is set in advance in the storage table, the second offset correcting unit reads the write-once center offset β corresponding to the target track position from the storage table and corrects the write-once center offset β.

The write-once type storage apparatus of the present invention further has an offset measuring unit measuring the write-once center offset at every track position and registering and saving the write-once center offset in the storage table.

The offset measuring unit comprises:

a measurement data recording unit positioning the head at a target track and recording measurement information on the disk medium by the recording element;

a measurement data reproducing unit reading the measurement information from the storage medium while scanning a predetermined scanning range by the head, the scanning range including a recording starting position of the head and ranged from an inner circumferential side to an outer circumferential side; and an offset detecting unit obtaining distribution of evaluation values in the predetermined scanning range from a measurement data read signal obtained by the measurement data reproducing unit and detecting and saving the write-once center offset from the distribution of the evaluation values.

The offset detecting unit detects amplitude of the read signal, which is obtained by the measurement data reproducing unit, as the evaluation values and detects the write-once center offset from a peak value of the distribution of the amplitude.

The offset detecting unit detects an error rate of the read signal, which is obtained by the measurement data reproducing unit, as the evaluation values and detects the write-once center offset from a bottom peak value of the distribution of the error rate.

In the write-once type storage apparatus of the present invention, the head has a plurality of reading elements arranged around a positioning reading element in a track direction, the reading elements being disposed so as to be mutually shifted in a transverse direction of the track by predetermined mutually different deviation amounts;

the offset measuring unit comprises:

a measurement data recording unit positioning the head at a target track by using one of the plurality of reading elements as the positioning reading element and recording measurement information on the disk medium by the recording element;

a measurement data reproducing unit reading the measurement data from the storage medium by the reading elements in the state that the head is positioned at the target track position by the positioning reading element;

the offset detecting unit detecting the amount of positional deviation of the reading element having a peak amplitude value or a minimum error rate value among measurement data read signals of the plurality of reading elements obtained by the measurement data reproducing unit, the positional deviation being with respect to the positioning reading element and detected as the write-once center offset.

In the write-once type storage apparatus of the present invention, the head has a plurality of reading elements arranged around a positioning reading element in a transverse direction of tracks in both sides, the reading elements being disposed respectively at intervals obtained by adding predetermined mutually different deviation amounts to the interval of the track pitch; and the offset measuring unit comprises:

a measurement data recording unit positioning the head at a target track by using one of the plurality of reading elements as the positioning reading element and recording measurement information on the disk medium by the recording element;

a measurement data reproducing unit reading the measurement information from the storage medium by the reading elements in the state that the head is positioned at the target track position by the positioning reading element; and an offset detecting unit detecting the amount of positional deviation of the reading element having a peak amplitude value or a minimum error rate value among measurement data read signals of the plurality of reading elements obtained by the measurement data reproducing unit, the positional deviation being with respect to the positioning reading element and detected as the write-once center offset.

(Storage Control Circuit)

The present invention provides a control circuit of a write-once type storage apparatus. The present invention is the control circuit of the write-once type storage apparatus which supports a head having a recording element and a reading element at a distal end of a rotary actuator and reproduces information after once continuously writing the information to a disk medium by the recording element; the write-once type storage apparatus comprising:

a recording processing unit, when write to an unused track adjacent to a recorded track is to be carried out, setting a track pitch narrower than a writing width of the recording element so that part of the recorded track overlapped with the unused track is overwritten and continuously recording the information on the disk medium toward one direction along with the track pitch;

a first offset correcting unit reading a write/read offset from a storage table set in advance, and correcting the write/read offset in the state that the reading element is positioned at a target track, the write/read offset being positional deviation between the recording element and the reading element;

a second offset correcting unit correcting a write-once center offset β, the write-once center offset being positional deviation between a read center of the reading element, which has undergone correction of the write/read offset by the first offset correcting unit, and an effective track width center of the write-once recording; and a reproduction processing unit reproducing the information of the disk medium by the reading element in the state that the write/read offset and the write-once center offset are corrected.

(Method)

The present invention provides a control method of a write-once type storage apparatus. The present invention is the control method of the write-once type storage apparatus which supports a head having a recording element and a reading element at a distal end of a rotary actuator and reproduces information after once continuously writing the information to a disk medium by the recording element; the write-once type storage apparatus comprising:

a recording process of, when write to an unused track adjacent to a recorded track is to be carried out, setting a track pitch narrower than a writing width of the recording element so that part of the recorded track overlapped with the unused track is overwritten and continuously recording the information on the disk medium toward one direction along with the track pitch;

a first offset correcting process of reading a write/read offset from a storage table set in advance and correcting the write/read offset in the state that the reading element is positioned at a target track, the write/read offset being positional deviation between the recording element and the reading element;

a second offset correcting process of correcting a write-once center offset β, the write-once center offset being positional deviation between the position of a read center of the reading element, which has undergone correction of the write/read offset by the first offset correcting unit, and the position of an effective track width center of the write-once recording; and a reproduction process of reproducing the information of the disk medium by the reading element in the state that the write/read offset and the write-once center offset are corrected.

According to the present invention, in addition to correction of the write/read offset which is the positional deviation between the recording element and the reading element, the amount of the deviation of the center position of the effective recorded track with respect to the recording center position of the recording element, which is an offset unique to write-once type recording, is obtained as the write-once center offset by a calculation or measurement and corrected. Thus, positioning of the reading element at the center of the effective recorded track, in which an overlapping part is recorded over in one direction, improvement of reproduction signal quality, and increase of the recording density can be expected.

BRIEF DESCRIPTION OF DRAWINGS

FIG. 3 is an explanatory drawing showing contents of a control table of FIGS. 1A and 1B, which stores positional deviation measurement results according to the present embodiment;

FIGS. 5A and 5B are explanatory drawings of track writing processes in the present embodiment in which head overlapping parts caused by the yaw angle are overwritten;

FIGS. 17A and 17B are explanatory drawings showing another embodiment of the write-once center offset measuring process using a plurality of reading elements;

FIGS. 19A and 19B are explanatory drawings showing another embodiment of the write-once center offset measuring process using a plurality of reading elements.

BEST MODE FOR CARRYING OUT THE INVENTION

Figure 1A:
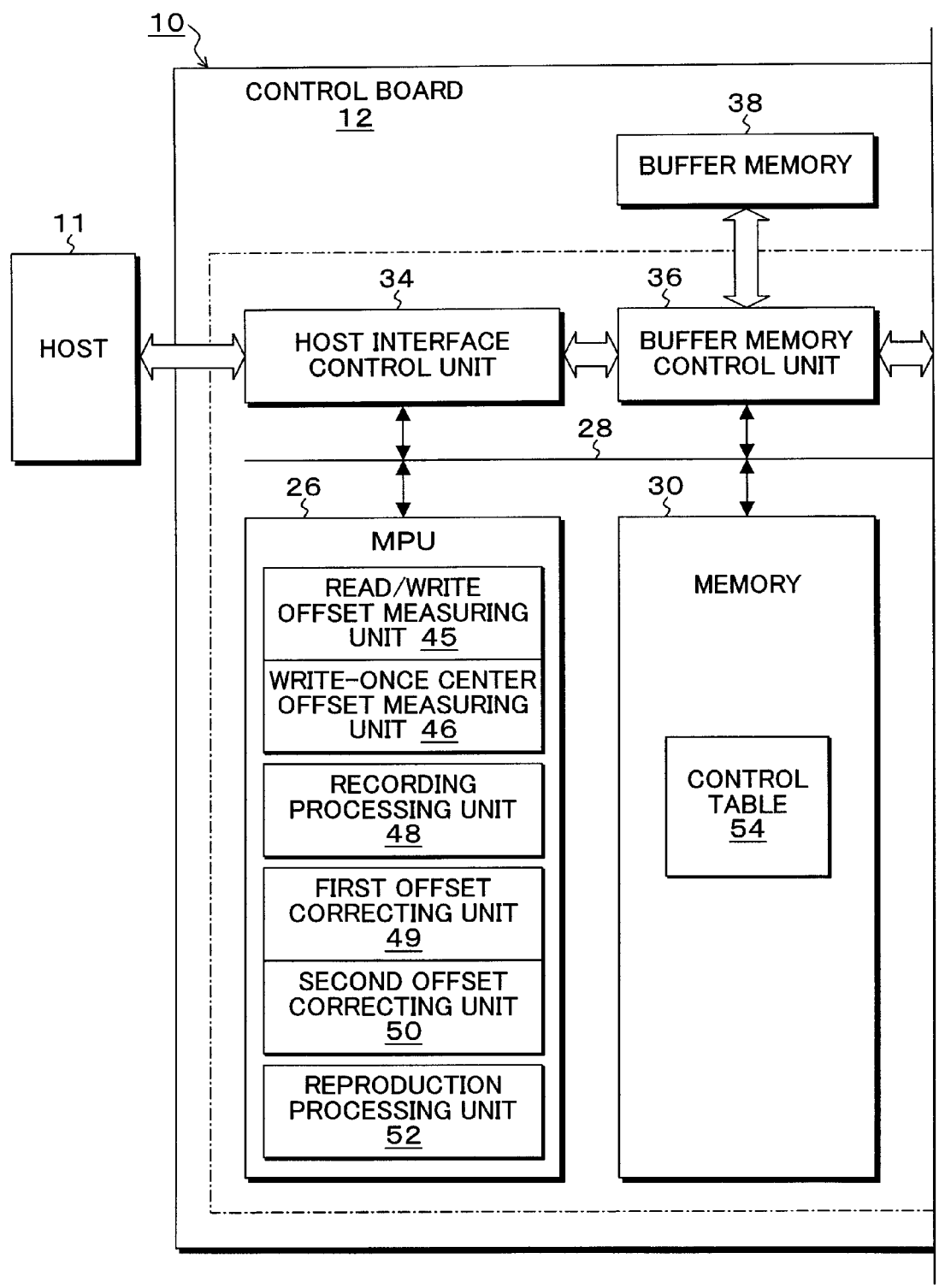
FIGS. 1A and 1B are block diagrams of a write-once type storage apparatus showing an embodiment of a write-once type storage apparatus according to the present invention.
Figure 1B:
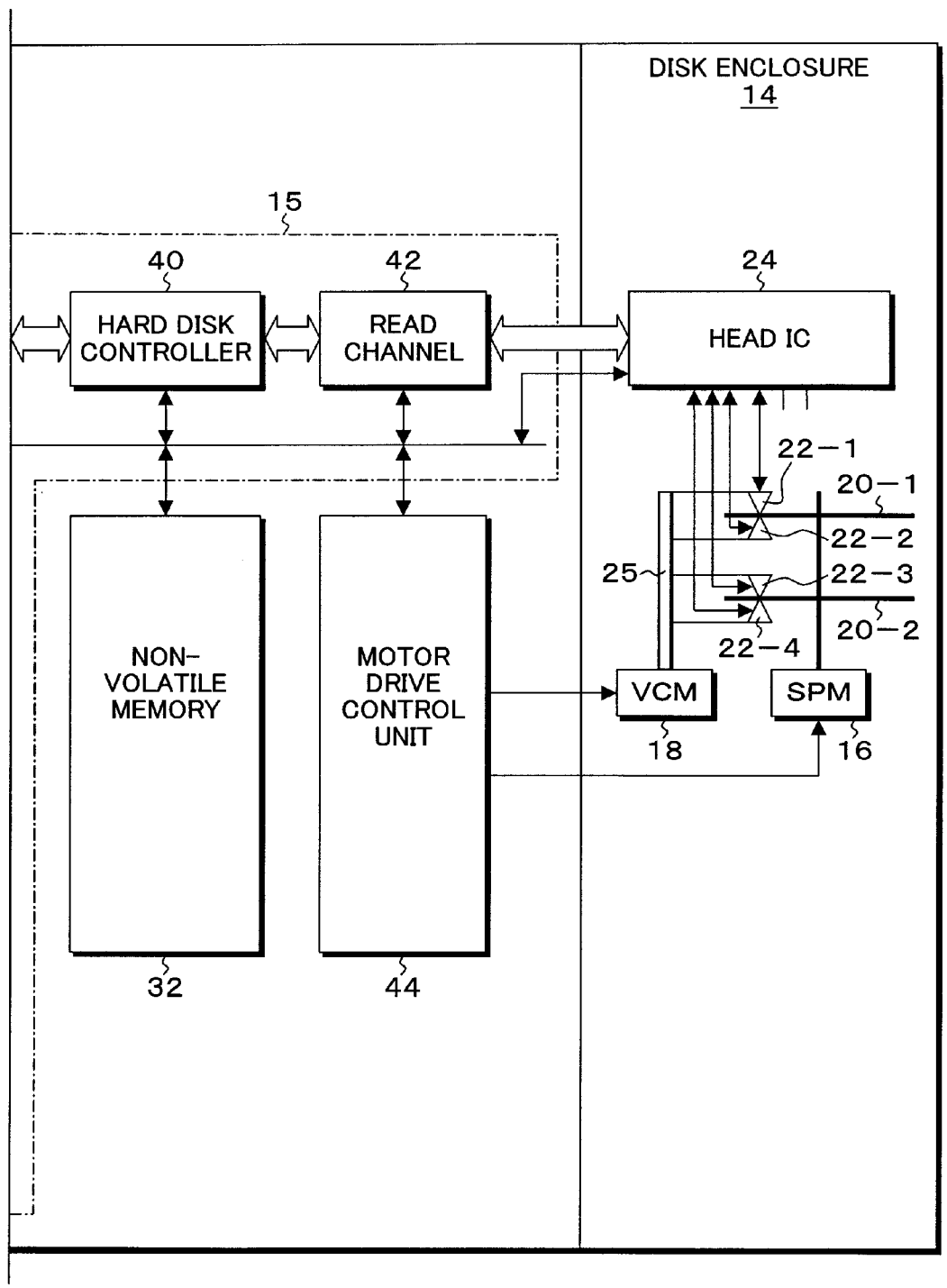

FIGS. 1A and 1B are block diagrams of a write-once type storage apparatus to which the present invention is applied. In FIGS. 1A and 1B, the write-once type storage apparatus 10 known as a write-once type hard disk drive (HDD) comprises a disk enclosure 14 and a control board 12. A spindle motor 16 is provided in the disk enclosure 14, and magnetic disks (disk media) 20-1 and 20-2 are attached to a rotating shaft of the spindle motor 16 and rotated for predetermined time, for example, at 4200 rpm. The disk enclosure 14 is provided with a rotary actuator 25. The rotary actuator 25 is provided with a voice coil motor 18. The voice coil motor 18 has heads 22-1 to 22-4 mounted on distal ends of arms thereof and carries out positioning of the heads with respect to recording surfaces of the disk media 20-1 and 20-2. The heads 22-1 to 22-4 are the heads of a composite type in each of which a recording element and a reading element are integrated. A recording element of a longitudinal magnetic recording type or a recording element of a perpendicular magnetic recording type is used as the recording element. In the case of the recording element of the perpendicular magnetic recording type, perpendicular storage media each of which having a recording layer and a soft magnetic backing layer are used as the magnetic disks 20-1 and 20-2. A GMR element or a TMR element is used as the reading element. The heads 22-1 and 22-2 are connected to a head IC 24 by signal lines. The head IC 24 selects one of the heads by a head select signal based on a write command or a read command from a host, which is a higher-level device, and carries out write for write-once recording, which is carried out one time, or reading, which is repeated after the write-once recording. The head IC 24 is provided with a write amplifier for a write system and provided with a preamplifier for a read system. The control board 12 is provided with a MPU 26. A memory 30, which uses a RAM and stores a control program and control data, and non-volatile memory 32, which uses a FROM or the like and stores a control program, are provided with respect to a bus 28 of the MPU 26. In addition, on the bus 28 of the MPU 26, a host interface control unit 34, a buffer memory control unit 36, which controls a buffer memory 38, a hard disk controller 40, which functions as a format, a read channel 42, which functions as a write modulating unit and a read demodulating unit, and a motor drive control unit 44, which controls the voice coil motor 18 and the spindle motor 16, are provided. Furthermore, the MPU 26, the memory 30, the non-volatile memory 32, the host interface control unit 34, the buffer memory control unit 36, the hard disk controller 40, and the read channel 42 provided on the control board 12 constitute a control circuit 15, and the control circuit 15 is realized as one LSI circuit. In order to carry out a head positional deviation measuring process in which the offsets (amounts of positional deviation) of the recording heads and the reproducing heads provided on the heads 22-1 to 22-4 are measured and saved in a control table 54 by test equipment, and the like at the time when assembly of the device is completed, the MPU 26 is provided with the functions of a write/read offset measuring unit 45, a write-once center offset measuring unit 46, a recording processing unit 48, a first offset correcting unit 49, a second offset correcting unit 50, and a reproduction processing unit 52. The host 11 of the test equipment, which is in the state that it is connected to the write-once type storage apparatus 10, downloads measurement firmware (program) for measuring the head positional deviation, to the memory 30, for example. The MPU 26 executes the measurement firmware, which is downloaded to the memory 30, thereby realizing the functions of the write/read offset measuring unit 45, the write-once center offset measuring unit 46, the recording processing unit 48, the first offset correcting unit 49, the second offset correcting unit 50, and the reproduction processing unit 52 and executing the process of detecting a write/read offset α and a write-once center offset β and saving them in the control table (storage table) 54. With respect to each of the heads 22-1 to 22-4 and on each of storage medium surfaces of the magnetic disks 20-1 and 20-2, the write/read offset measuring unit 45 detects the write/read offset α, which is positional deviation between the recording element and the reading element provided on each head, in the state in which the reading element of the head is positioned at a target track and stores the offset in the control table 54. In the measurement process of the write/read offset measuring unit 45, specifically, after the head is positioned at the target track and measurement data is recorded on the magnetic disk by the recording element, the measurement data is reproduced from the magnetic disk while scanning a predetermined scanning range from the inner circumferential side to the outer circumferential side including a recording starting position by the head, the distribution of evaluation values in the scanning area is obtained by using the signal amplitude or error rate of the reproduced measurement data read signal as the evaluation values, the amount of the positional deviation from the position at which the signal amplitude has a peak value or the error rate has a smallest value is detected as the write/read offset α and set in the control table 54. In the state in which the head is positioned at the target track and the write/read offset α is corrected, the write/read offset measuring unit 45 detects the write-once center offset β, which is positional deviation between a read center of the reading element and an effective track width center caused by write-once recording for setting in the control table 54. In the write-once recording of the present embodiment, when write to an unused track adjacent to a recorded track is to be carried out, a track pitch narrower than the recording width of the recording element is set so that the part of the recorded track that is overlapped with the unused track is overwritten, and information is continuously recorded in one direction on the disk medium along with the track pitch. Therefore, an effective track width is narrower than the recording width of the track, and even when the reading element is positioned at a write center, which is the center of the recording width, positional deviation from a write-once center, which is the center of the effective track width, is generated. In the present embodiment, this positional deviation is detected as the write-once center offset β and set in the control table 54.

The write-once center offset β in the present embodiment is measured by any of (1) a method of calculating by calculations and (2) a method of detecting by recording/reproducing measurement data.

In such offset measurement, while sequentially selecting the four heads 22-1 to 22-4, measurement processes are executed by using all the tracks or a plurality of tracks, which are determined in advance, on the storage medium surface of the magnetic disk 20-1 or 20-2 corresponding to each head as target tracks. When the offset measurement is carried out for part of the tracks of the storage medium surface, the offsets of the unmeasured tracks are calculated by interpolation calculations of the measured offsets and stored in the control table 54, or the interpolation calculations are carried out every time the head positional deviation is corrected as described later. When the offset measurement processes are finished, part of the measurement firmware downloaded from the host 11 to the memory 30 is deleted. Consequently, the functions of the write/read offset measuring unit 45 and the write-once center offset measuring unit 46 shown in the MPU 26 are deleted. Along with a stop termination process of the device, the control table 54 of the memory 30 in which the amounts of the head positional deviation are detected is written to an outermost system area of the medium recording surface of, for example, the magnetic disk 20-1 corresponding to the head 22-1 and stored in a non-volatile manner. Then, when power is turned on in the state in which the device is connected to the host 11 of a user, the write-once type storage apparatus 10 is activated, the programs corresponding to the write-once type storage apparatus 10 of the present embodiment are executed by the MPU 26, thereby enabling the functions of the recording processing unit 48, the first offset correcting unit 49, the second offset correcting unit 50, and the reproduction processing unit 52. Upon an initialization process of the activation, the control table 54 is read from the system area of the storage medium surface of the magnetic disk 20-1 by the head 22-1 and disposed in the memory 30 as shown in the drawing. In a read process of the case in which a read command is received from the host 11 by the MPU 26, when the head 22-1 is caused to seek a target track and subjected to on-track following control, the head positional deviation amount corresponding to the target track is read from the control table 54 of the memory 30, offset correction is carried out by driving the VCM 18 so as to eliminate the head positional deviation amount, and the head is subjected to positioning control to the position at which a reproduced signal is largest or the position at which the error rate is minimum with respect to the recording pattern of the target track. The write-once type storage apparatus 10 of the present embodiment supports the heads 22-1 to 22-4, each of which has the recording element and the reading element, at the distal ends of the rotary actuator 25, selects any one head from the heads 22-1 to 22-4 by the head IC 24, and writes data to the recording surfaces corresponding to the magnetic disks 20-1 and 20-2 once and then repeatedly reproduces it. The recording processing unit 48 of such write-once type storage apparatus 10 sequentially writes data from the track at which the yaw angle of the rotary actuator 25 in the recording track region of each of the recording surfaces of the magnetic disks 20-1 and 20-2 is largest toward the track at which the yaw angle is 0 degree. In the present embodiment, the recording processing unit 48 sequentially writes data from an outermost track toward the track at which the yaw angle is 0 degree on, for example, the recording surface of the magnetic disk 20-1 or 20-2 and then sequentially writes data from an innermost track toward the track at which the yaw angle is 0 degree. With respect to the recording surfaces of the magnetic disks 20-1 and 20-2 on which once write by the recording processing unit 48 has been carried out, the reproduction processing unit 52 sequentially reads the once-write recorded data from a track having a large yaw angle toward a track having a smaller yaw angle. The first offset correcting unit 49 reads the write/read offset α, which is the positional deviation between the recording element and the reading element, from the control table 54 for correction in the state in which the reading element of the head is positioned at a target track upon reproduction. Upon reproduction, in the state in which the write/read offset α is corrected by the first offset correcting unit 49, the second offset correcting unit 50 reads the write-once center offset β, which is the positional deviation between the read center position of the reading element and the effective track width center position generated by the once-write recording, from the control table 54 for correction.

Figure 2:
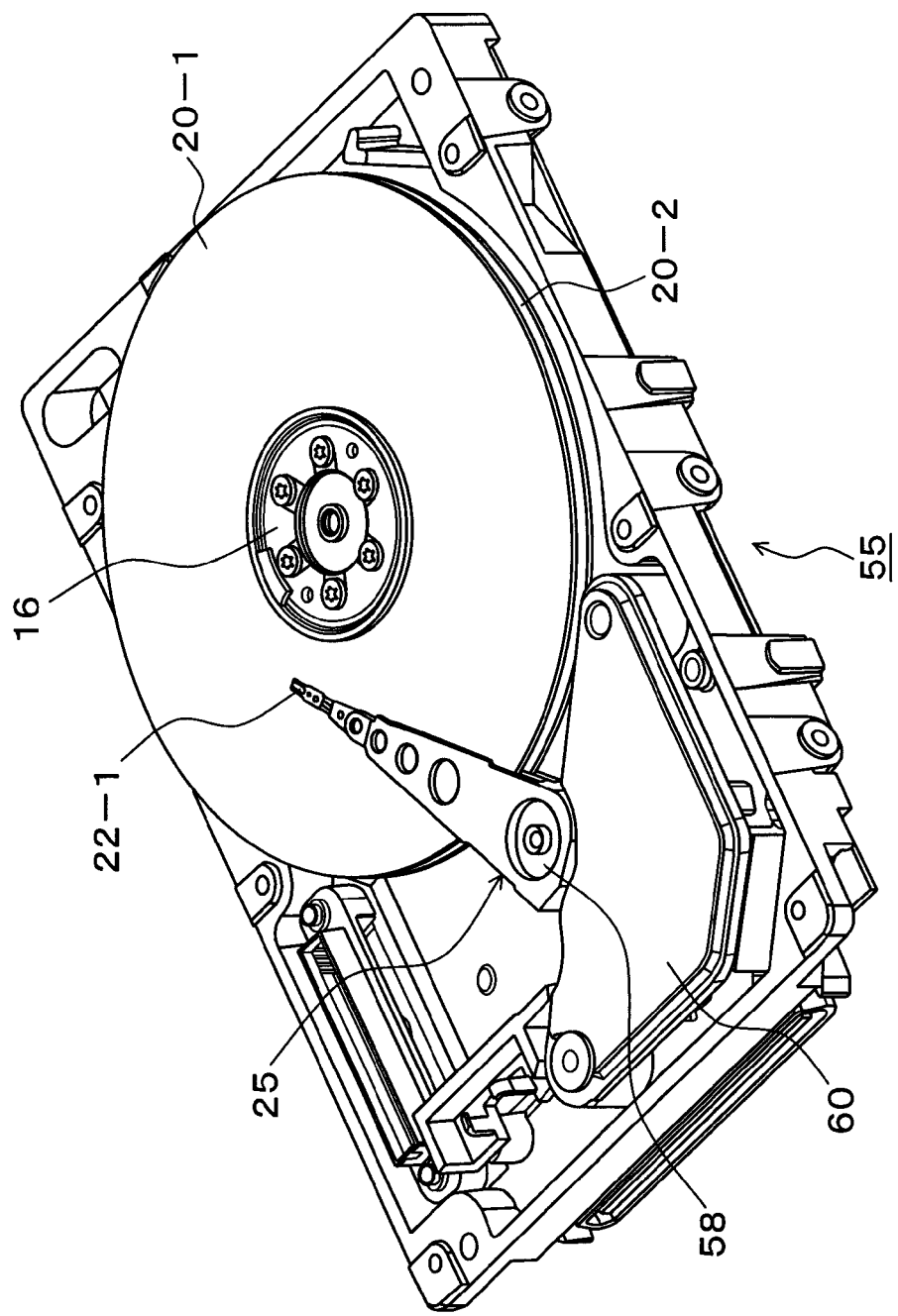
FIG. 2 is an explanatory drawing of a mechanism structure of the write-once type storage apparatus according to the present embodiment.

FIG. 2 is an explanatory drawing of a mechanism configuration of the write-once type storage apparatus in the present embodiment. In FIG. 2, in the write-once type storage apparatus of the present embodiment, the magnetic disks 20-1 and 20-2, which are rotated at a constant speed by the spindle motor 16, are disposed on a base 55. With respect to the magnetic disks 20-1 and 20-2, the rotary actuator 25 rotatably supported by a shaft unit 58 is disposed. The head 22-1 is disposed at the distal end of the arm of the rotary actuator 25, and a coil provided in the opposite side of the arm is rotatably disposed between yokes 60, which are disposed above and below a permanent magnet, which is attached and fixed to the base 55.

FIG. 3 is an explanatory drawing showing the control table 54 of FIGS. 1A and 1B, which stores offset measurement results in the present embodiment. In FIG. 3, in the control table 54, head numbers, cylinder addresses, and offsets are set. Corresponding to the four heads 22-1 to 22-4 of FIGS. 1A and 1B, HH01 to HH04 are set as the head numbers. The cylinder addresses correspond to the track addresses at which the heads 22-1 to 22-4 are positioned, and, if the total number of the tracks is n, the cylinder addresses are CC1 to CCn, respectively. Moreover, in the present embodiment, the write/read offsets of the target tracks which are specified by the head numbers and the cylinder addresses are measured and stored as α1 to α4n by the write/read offset measuring unit 45, and, furthermore, the write-once center offsets are measured and stored as β1 to β4n by the write-once center offset measuring unit 46. As a matter of course, as the values of the positional deviation amounts to be stored in the control table 54, after registering the values measured at a plurality of track positions in the radial direction including the outermost and innermost positions, deviation amounts obtained by interpolation calculations of the measured values of both sides may be stored as the part therebetween; or the deviation amounts may be measured for all the tracks for storage.

Figure 4:
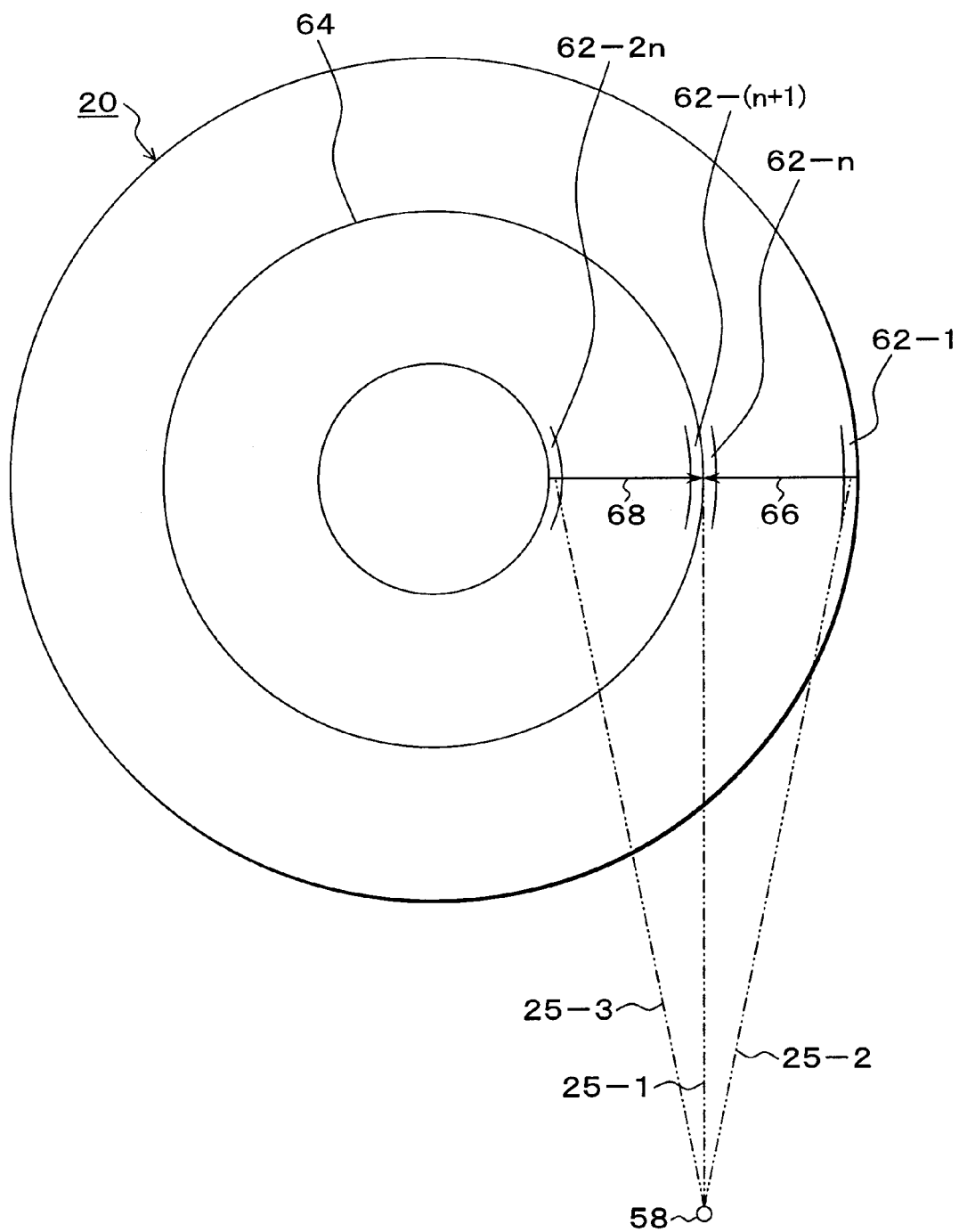
FIG. 4 is an explanatory drawing of a write-once type writing process in the present embodiment with respect to a magnetic disk.

FIG. 4 is an explanatory drawing of a write-once type writing process with respect to a magnetic disk in the present embodiment. In FIG. 4, with respect to a user recording track area of the magnetic disk 20, the rotary actuator 25, which is schematically shown, is rotated by the shaft unit 58, which is the center of rotation, so that the head at the distal end can be positioned at an arbitrary track position. When the position at which the yaw angle θ is equal to 0 degree, where the axial core line of the rotary actuator 25 is matched with the track direction of the magnetic disk 20, is a 0 degree boundary line 64 of the yaw angle, the closer the rotary actuator 25 is to the outer side or the inner side, the larger the yaw angle θ, and the yaw angle θ is maximum at an outermost track 62-1 and an innermost track 62-2n. In the write-once recording of the present embodiment, for example, the outermost track 62-1 at which the yaw angle is the maximum is used as a starting position, and data is sequentially written toward a track 62-n which is adjacent to the 0 degree boundary line 64 of the yaw angle where the yaw angle is 0 degree. Next, data is sequentially written from the innermost track 62-2n at which the yaw angle is the maximum toward a track 62-(n+1) which is adjacent to the 0 degree boundary line 64 of the yaw angle.

FIGS. 5A and 5B are explanatory drawings of track writing processes in which head overlapping parts caused by the yaw angle in the write-once type writing process of the present embodiment are overwritten. FIG. 5A shows write of the innermost track side, and FIG. 5B shows write of the outermost side. In the case in which the write of the innermost side of FIG. 5A is taken as an example, when the head 22 is positioned at the innermost track 62-2n, the yaw angle of the rotary actuator 25 at this point is the maximum, the inclination of the head 22 also becomes maximum, and part of the head 22 is overlapped with an adjacent track 62-(2n−1) over the track width due to the inclination of the head 22. Note that the head 22 shows the state of the case in which the magnetic disk is fixed and the head 22 is relatively moved in the manner of an in-motion photograph. In the present embodiment, with respect to the overlapping part of the head 22, which is caused along with the yaw angle, the track pitch Tp is determined so that the overlapping part of the head 22 is overwritten upon write of the adjacent track 62-(2n−1). Also when write of the track 62-(2n−1) is carried out, part of the head 22 is similarly overlapped with a track 62-(2n−2), and this overlapping part is overwritten upon write of the track 62-(2n−2). Therefore, conventionally, although the track pitch used to be determined somewhat wider so that the overlapping part due to the inclination of the head 22 caused along with the yaw angle does not enter the adjacent track, the track pitch is determined so that the overlapping part of the adjacent track is overwritten in the present embodiment. Therefore, the track pitch can be narrowed in the write-once recording. As a result, the track density of the magnetic disk 20 can be increased, and the surface recording density as a whole with respect to the recording surfaces can be significantly improved. A similar thing applies also to the outermost side of FIG. 5B. When the head 22 is positioned at the outermost track 62-1, the yaw angle is the maximum, part of the head 22 is overlapped with an adjacent track 62-2, the track pitch is determined so that the overlapping part is overwritten upon write of the track 62-2, the track pitch can be similarly narrowed even when there is overlapping caused by the yaw angle, and the surface recording density can be increased by increasing the track density. As shown in FIGS. 5A and 5B, determining the track pitch so that the overlapping part, which is caused by the inclination of the head with respect to the yaw angle, is overwritten by write of the adjacent track is important for improvement of the surface recording density of the present embodiment. Such track pitch can be determined by: writing test data to, for example, the innermost track 62-2$n$ of FIG. 5A; then setting a default track pitch and writing different test data to the adjacent track 62-(2$n$−1); then reading the test data of the innermost track 62-2$n$ and obtaining the error rate thereof; repeating the process that is based on the write of the test data to the two adjacent tracks and the read data of the error rate while sequentially reducing the track pitch until a required error rate threshold value is obtained; and determining a minimum track pitch that satisfies the error rate as an optimal track pitch. Such determination of the optimal track pitch is carried out in a servo write step in a manufacturing stage of the write-once type storage apparatus.

Figure 6A:
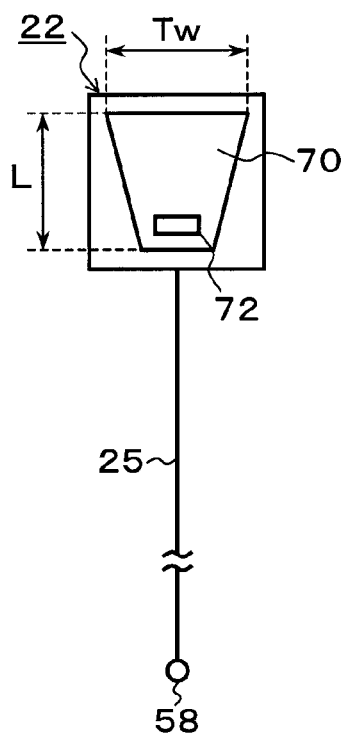
FIGS. 6A, 6B, and 6C are explanatory drawings showing schematic configurations of a head in the present embodiment.
Figure 6B:
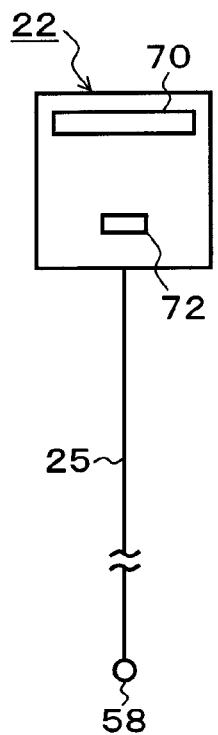
Figure 6C:
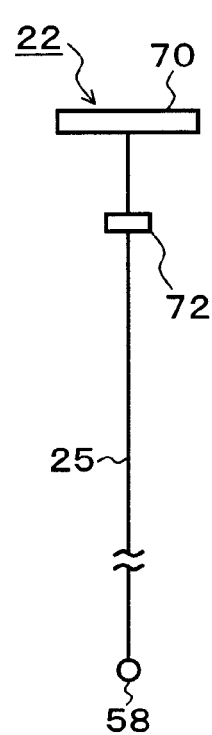

FIGS. 6A, 6B, and 6C are explanatory drawings showing schematic structures of the head in the present embodiment. FIG. 6A shows the state in which the head 22 is attached to the distal end of the rotary actuator 25, which is capable of rotating about the shaft unit 58, and the recording element 70 and the reading element 72 are mounted on the head 22. The recording element 70 records information to the magnetic disk by a recording element width Tw, which is in a lateral direction. The recording element 70 and the reading element 72 are disposed so as to have a distance L therebetween in the direction of the rotary actuator 25, that is, the track direction.

FIG. 6B shows the head 22 of FIG. 6A in a simplified manner, wherein the recording element 70 and the reading element 72 are separately shown. Furthermore, FIG. 6C is a drawing in which merely the recording element 70 and the reading element 72 of FIG. 6B are extracted and disposed at the distal end of the rotary actuator 25. In the write-once recording of FIGS. 5A and 5B, the recording element 70 of FIG. 6A is shown. In the embodiment hereafter, in addition to that, the arrangement of the recording element 70 and the reading element 72 as shown in FIG. 6B or FIG. 6C will be shown as a schematic configuration of the head.

Figure 7A:
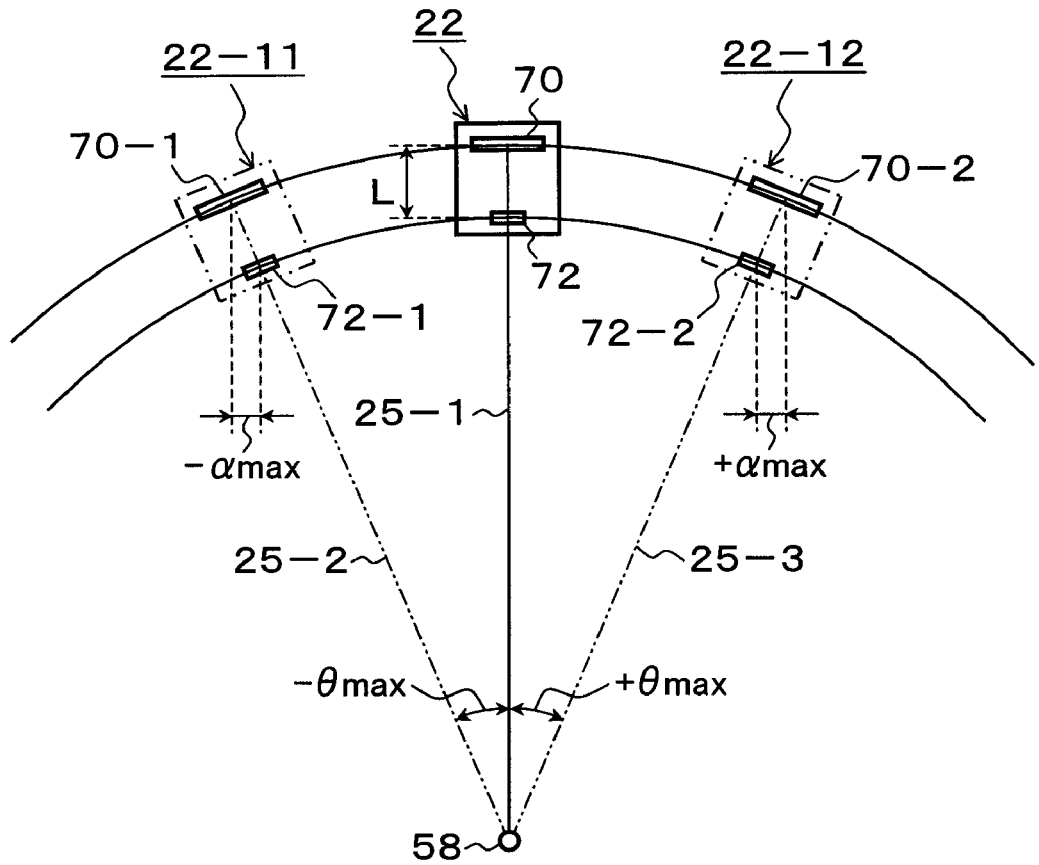
FIGS. 7A and 7B are explanatory drawings showing offsets with respect to a yaw angle in the case in which there is no write/read offset.
Figure 7B:
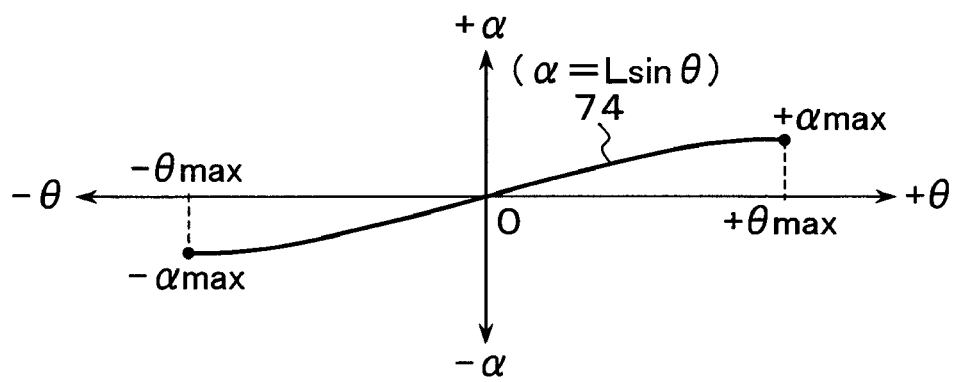

FIGS. 7A and 7B are explanatory drawings showing offsets with respect to the yaw angle in the case in which no write/read offset is present in the present embodiment. FIG. 7A shows the positions of the recording element 70 and the reading element 72 in the head 22 when the rotary actuator 25-1 is rotated about the shaft unit 58 from the position of the innermost actuator 25-2 to the position of the outermost actuator 25-3. First, as shown by the rotary actuator 25-1, when the yaw angle θ is 0°, the axial direction thereof and the tack direction of the magnetic disk are the same direction. Since the recording element 70 and the reading element 72 do not have positional deviation from each other in this case, in other words, since there is no write/read offset, when data is stored by the reading element 72 in the track at which the yaw angle θ is 0°, a positioning offset upon reading of the stored data is not generated at all. On the other hand, when the head is moved to the position of the innermost rotary actuator 25-2 at which the yaw angle is −θmax as shown by the head 22-11, as shown by the recording head 70-1 and the reading head 72-1, an offset −αmax corresponding to the yaw angle −θmax is generated therebetween. Conversely, at the position of the yaw angle +θmax where the head is moved to the position of the outermost rotary actuator 25-3 as shown by the head 22-12, an offset +αmax, which is in the opposite direction of that of the innermost side, as shown by the recording head 70-2 and the reading head 72-2 is generated. These are the yaw angle offsets caused upon usage of the rotary actuator on the magnetic disk.

FIG. 7B shows the offset α with respect to variation of the yaw angle θ as a yaw angle offset characteristic 74. The yaw angle offset characteristic 74 can be provided by $$\alpha = L \cdot \sin\theta\alpha \qquad (1)$$

Figure 8A:
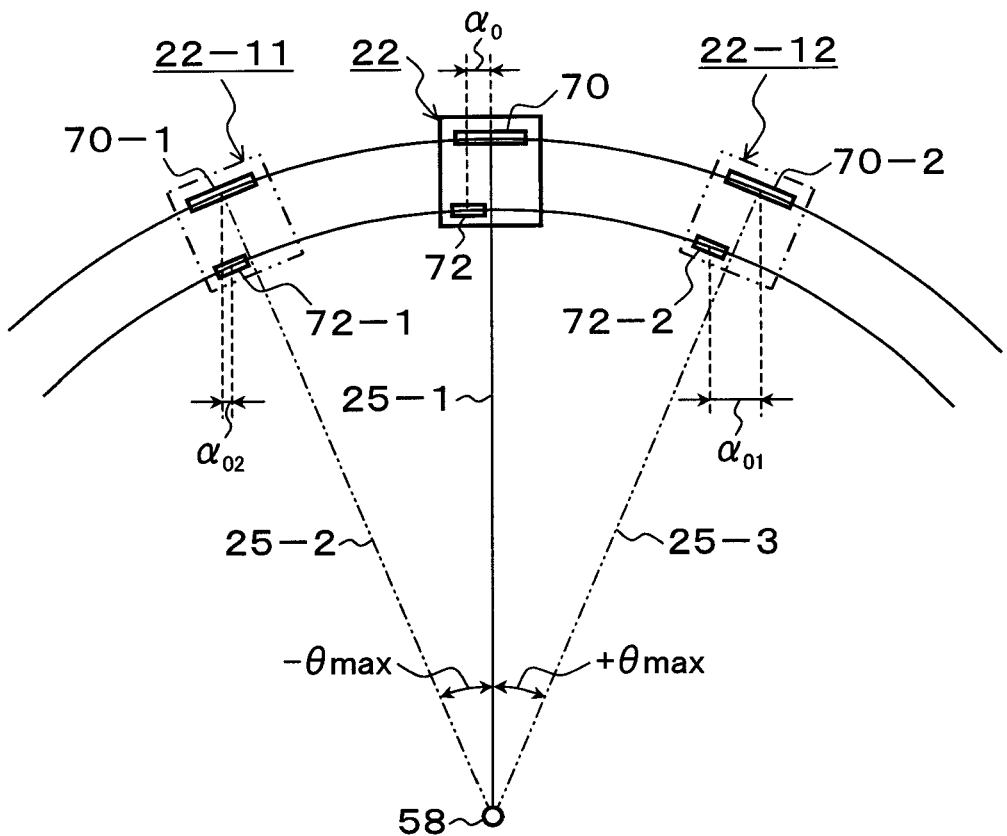
FIGS. 8A and 8B are explanatory drawings showing offsets with respect to the yaw angle in the case in which there is a write/read offset.
Figure 8B:
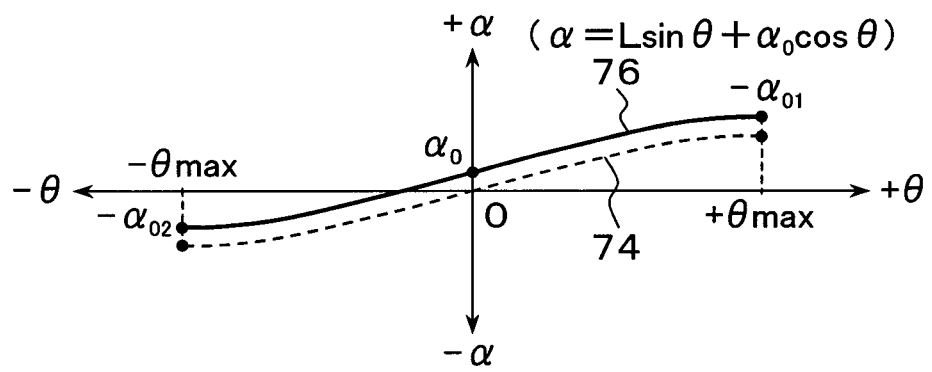

FIGS. 8A and 8B are explanatory drawings showing offsets with respect to the yaw angle in the case in which there is a write/read offset. In FIG. 8A, at the position of the rotary actuator 25-1 where the yaw angle θ is equal to 0°, a write/read offset α0 is generated between the recording element 70 and the reading element 72 of the head 22 as positional deviation in a manufacturing process. When there is the write/read offset in this manner, a write/read offset α02 of the recording element 70-1 and the reading element 72-1 becomes small at the position of the innermost rotary actuator 25-2 as shown by the head 22-11. On the other hand, the write/read offset of the recording element 70-2 and the reading element 72-2 becomes large as shown by α01 at the position of the outermost rotary actuator 25-3 where the yaw angle is +θmax as shown by the head 22-12.

FIG. 8B shows a write/read offset characteristic 76 of the case in which there is the write/read offset together with the yaw angle offset characteristic 74 of FIGS. 7A and 7B of the case in which there is no read/write offset. The write/read offset characteristic 76 is a result of adding the offset α0, which is positional deviation between the recording element 70 and the reading element 72, to the yaw angle offset characteristic 74 as a cosine component of the yaw angle θ. In other words, the read/write offset characteristic 76 can be provided by $$\alpha = L \cdot \sin\theta + \alpha 0 \cdot \cos\theta \qquad (2)$$

In FIG. 8A, the case in which the reading element 72 is offset to the left side with respect to the recording element 70 is taken as an example; however, when it is offset to the right side, the characteristic is shifted to the negative side with respect to the yaw angle offset characteristic 74. The write/read offset measuring unit 45 provided in the MPU 26 of FIGS. 1A and 1B measures the write/read offsets α as shown in FIGS. 8A and 8B in the state in which the head is positioned at a target track, which is a measurement target of the magnetic disk, and sets them as corresponding write/read offsets α1 to α4$n$ in the control table 54 as shown in FIG. 3.

Figure 9:
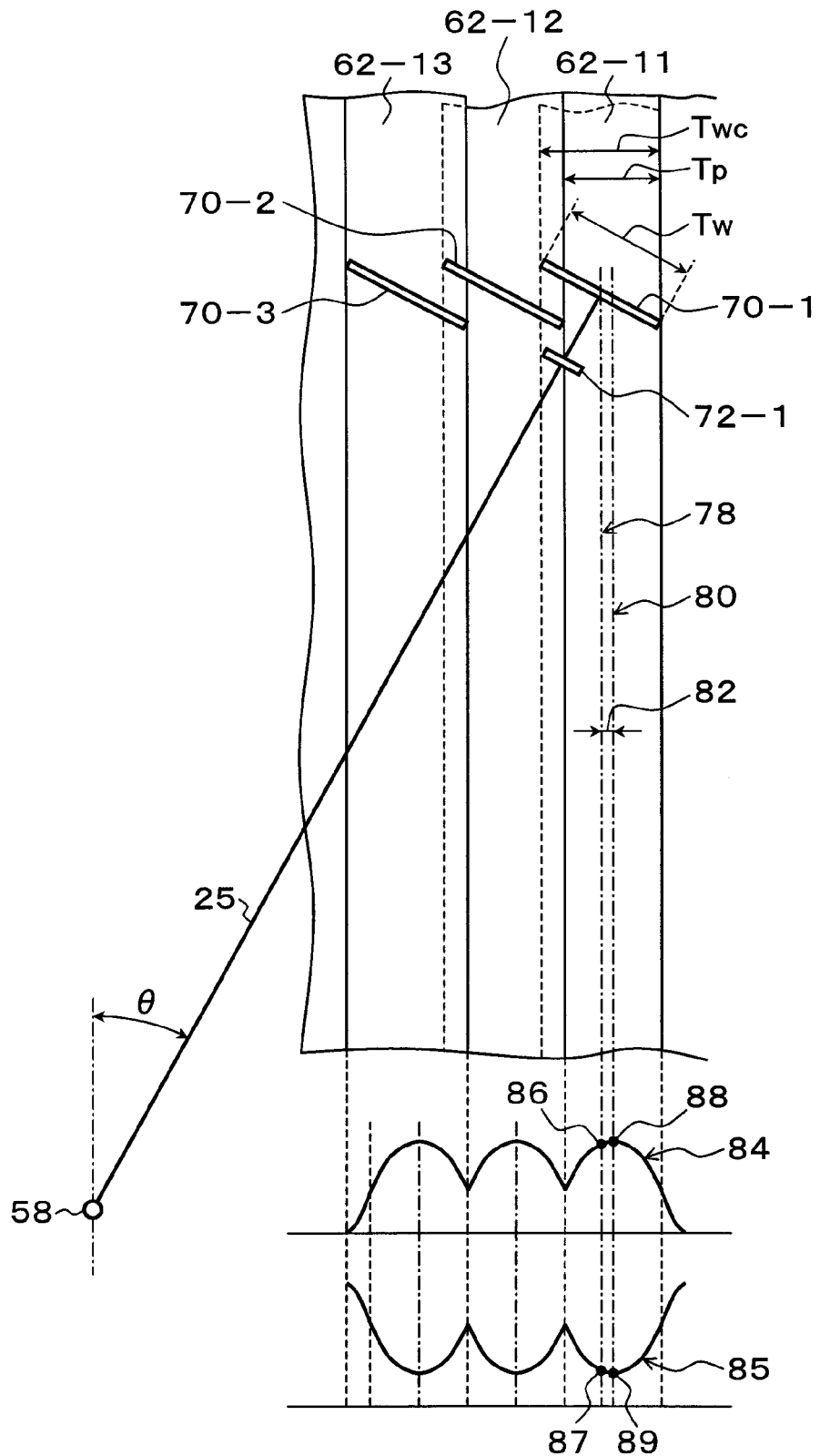
FIG. 9 is an explanatory drawing showing the positional relations of a recording element, a reading element, and tracks upon write-once recording in the present embodiment.

FIG. 9 is an explanatory drawing showing the positional relations of the recording element, the reading element, and tracks upon write-once recording in the present embodiment. As shown by recording elements 70-1, 70-2, and 70-3, FIG. 9 shows the state that the recording element of the head is sequentially moved toward the inner direction by the track pitch Tp at a time and that data is recorded to tracks 62-11, 62-12, and 62-13. Herein, when the data recording with respect to the track 62-11 is taken as an example, the recording element 70-1 disposed at the distal end of the rotary actuator 25 has the recording element width Tw, and a recording width Twc of this case can be provided by $$Twc = Tw \cdot \cos\theta \qquad (3)$$

since the recording width Twc is a cosine component of the yaw angle θ with respect to the recording element width Tw. Subsequent to such recording of the track 62-11 by the recording width Twc by the recording element 70-1 corresponding to the yaw angle θ, when the part that the recording width Twc of the track 62-11 is overlapped with the left side is overwritten in the next adjacent track 62-12, the track pitch of the track 62-11 becomes the specified track pitch Tp. Herein, the position that is the center of the recording width Twc in the track 62-11 is a write center 78. On the other hand, the center of the track pitch Tp that provides an effective track width formed by the write-once recording of the adjacent track 62-12 is a track center 80. As a matter of course, the recording of the track 62-11 by the recording element 70-1 is carried out in the state in which the head is caused to seek the target track and placed on the track by reading servo information by the reading element 72-1, and the position of the reading element 72-1 shown in the drawing with respect to the radial direction of the disk medium is the target track position upon recording of the track 62-11. Below the tracks 62-11 to 62-13, signal amplitude distribution 84 of a read signal, which is read while moving the reading element 72-1 and scanning the track in the transverse direction thereof after recording, and error rate distribution 85, which is similarly obtained from read data, is shown. In the signal amplitude distribution 84, the signal amplitude has an amplitude peak position 88 at the track center 80, which is the center of the track pitch Tp, and the write center 78, which is the center of the recording width Twc by which data is actually recorded, has an amplitude value 86 lower than that. Also regarding the error rate 85, a minimum error rate 89 is obtained at the track center 80, which is the center of the track pitch Tp, and an error rate 87 which is larger than that is obtained at the write center 78, which is the center of the recording width Twc.

Figure 10:
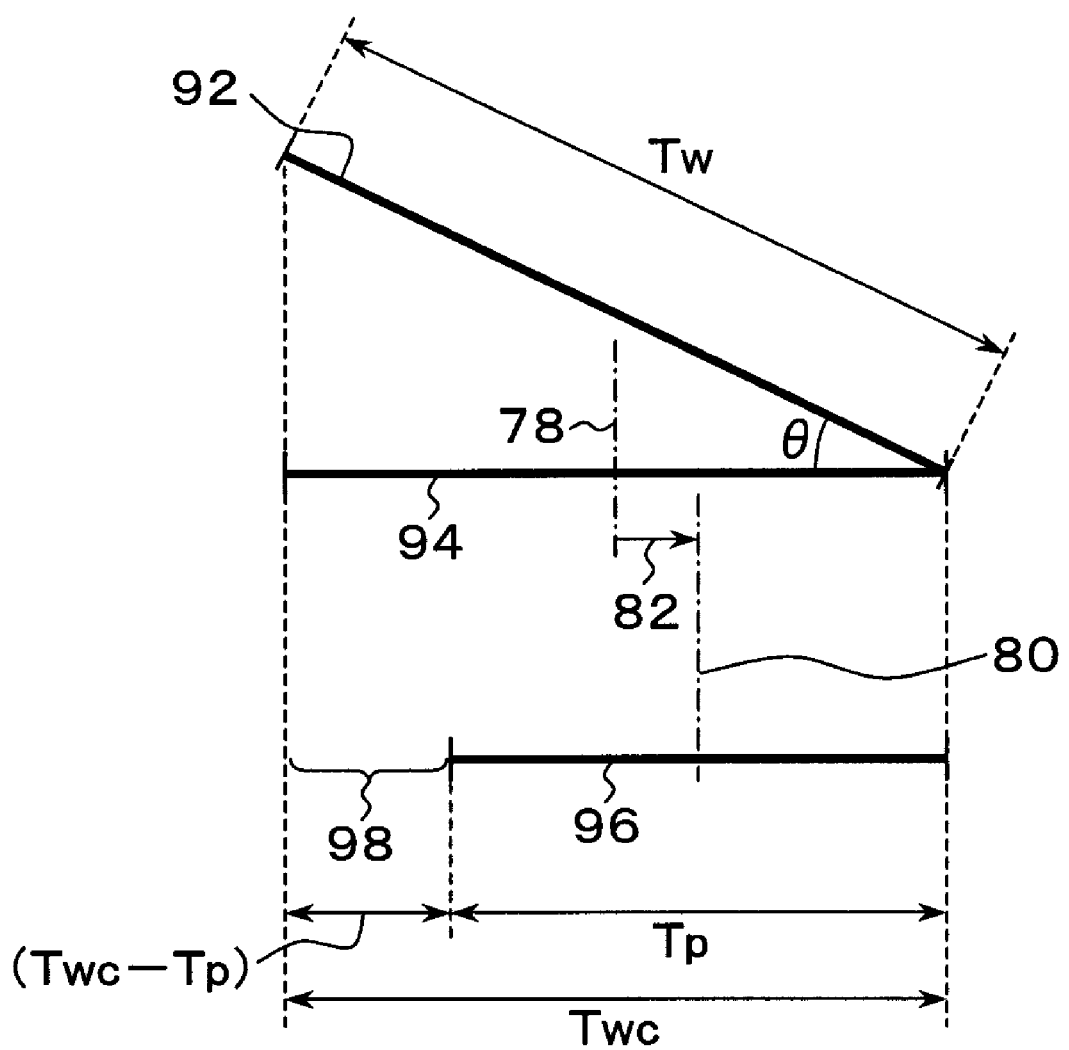
FIG. 10 is an explanatory drawing showing geometric positional relations of a recording element width, a recording width, an effective track width, a write center, and a write-once write center upon write-once recording of FIG. 9.

FIG. 10 shows geometric positional relations of the recording element width, the recording width, the effective track width, the write center, and the write-once write center upon write-once recording of FIG. 9. In FIG. 10, since the recording element is inclined in accordance with the yaw angle θ of the moment, a recording width 94 in the track width direction can be provided by Twc, which is the cosine component with respect to the yaw angle θ of Tw of a recording element width 92, as shown in the above described equation (3). With respect to such recording width 94, an adjacent track overwriting part 98 is generated by overwriting by write of the adjacent track. As a result, the recording width 94 becomes an effective track width 96 having the track pitch Tp.

Figure 11:
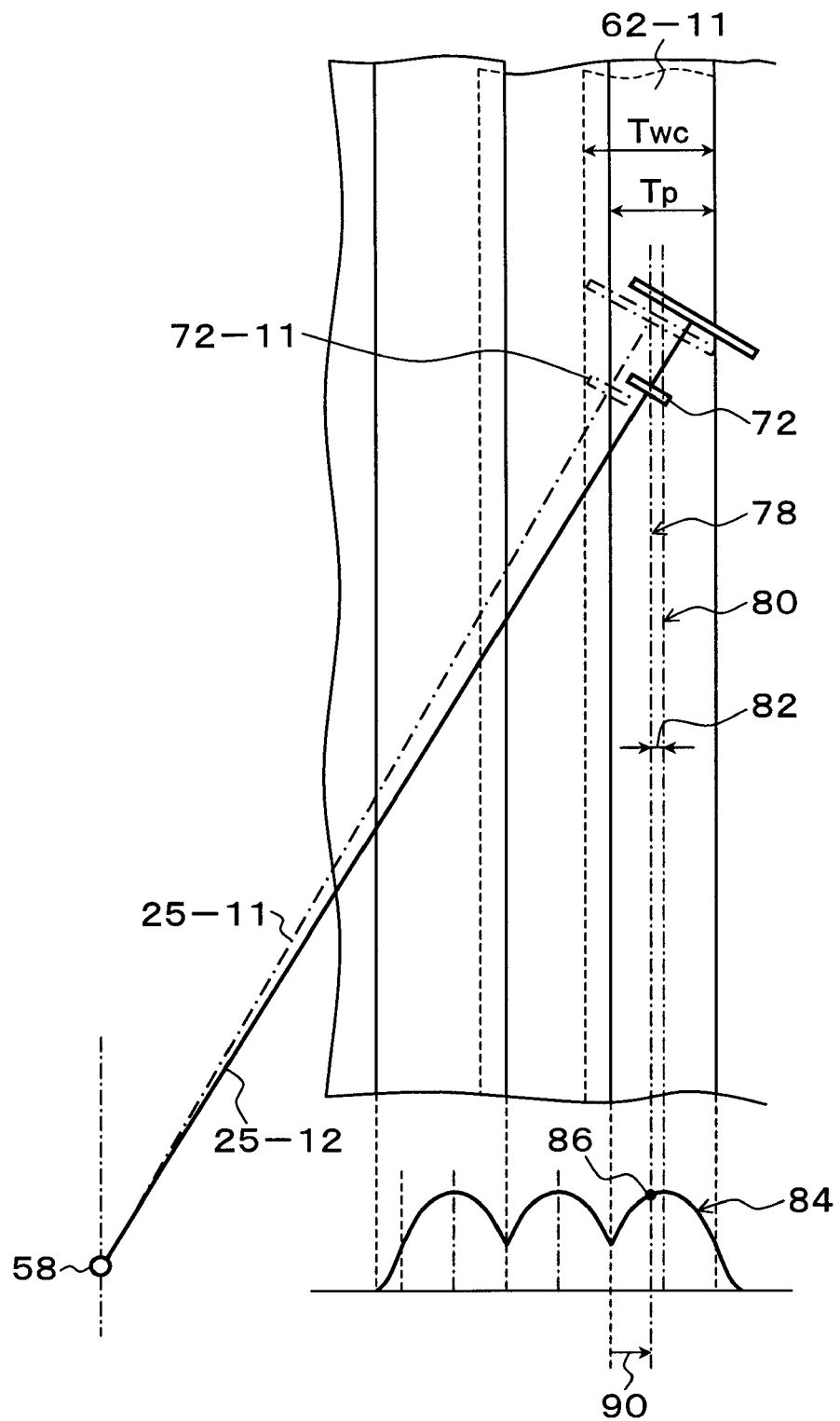
FIG. 11 is an explanatory drawing showing positioning of the reading element by correction of a write/read offset upon reproduction in the present embodiment.

FIG. 11 is an explanatory drawing showing positioning of the reading element by correction of a write/read offset upon reproduction in the present embodiment. In FIG. 11, when the track 62-11, which has been recorded in FIG. 9, is to be reproduced, the head is caused to seek and positioned at the target track position, which is the same as that upon recording, as shown by a reading element 72-11. The recording head 70-11 at this moment is at the same recording position as well as the reading head 72-1 of FIG. 9. However, the reading head 72-11 is not at the track center 80 of the track 62-11, which is the target track. Therefore, first, the first offset correcting unit 49 shown in FIGS. 1A and 1B reads the write/read offset α corresponding to the target track position, that is, the cylinder address thereof from the control table 54 and carries out offset correction in which the head is moved toward the outer direction by the amount of the write/read offset α. The reading head 72-11 is positioned as shown by the reading element 72 at the write center 78, which is the center of the recording width Twc, by the write/read offset α. For example, the value in the reproduction signal amplitude distribution 84 in the state in which the reading head 72 is positioned at the write center 78 is the amplitude value 86, which is below the peak value. In this manner, the write/read offset movement 90 of positioning the reading head at the target track position and moving the write/read offset α by the amount corresponding to the write/read offset α as shown below FIG. 11 is carried out first.

Figure 12:
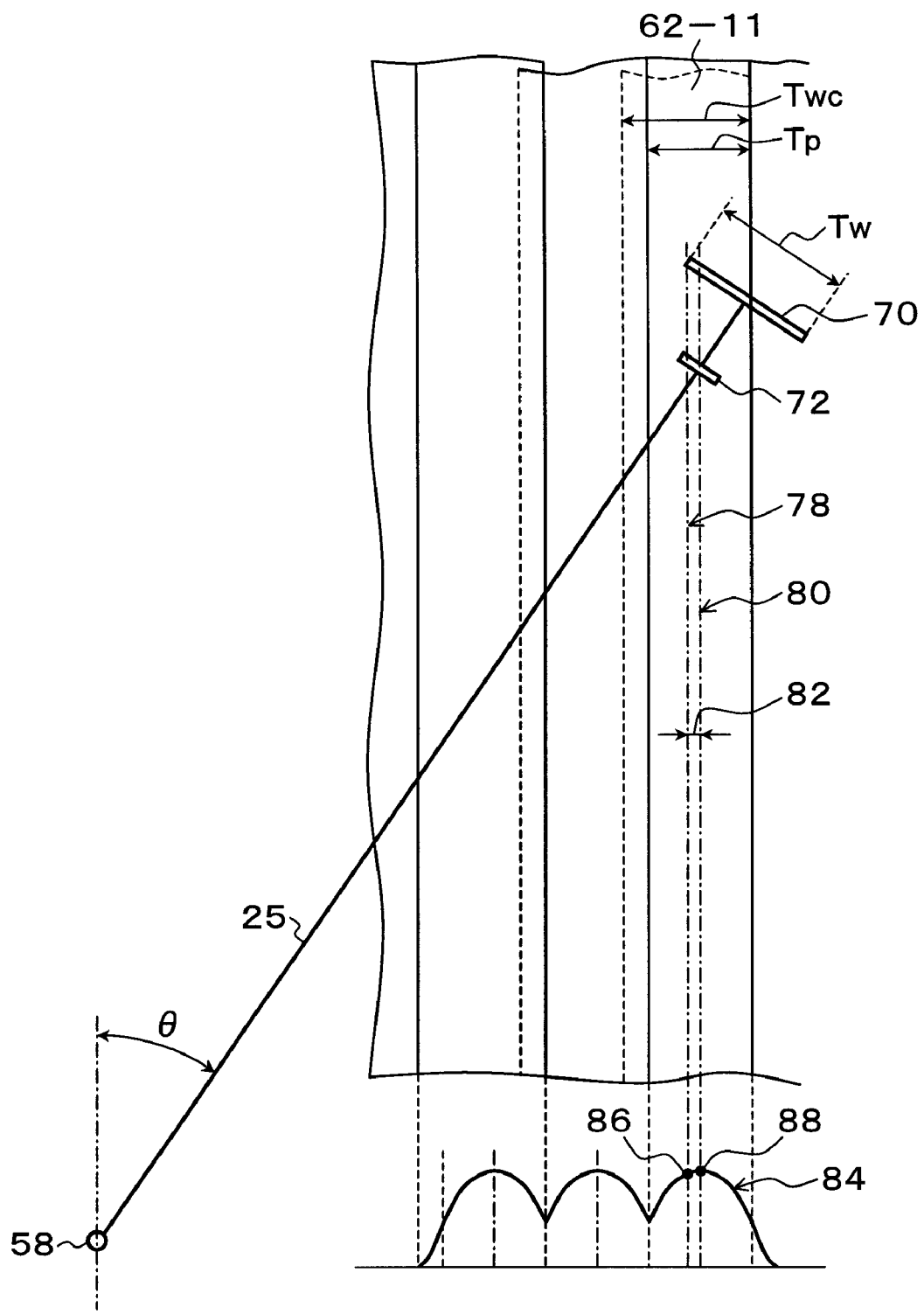
FIG. 12 is an explanatory drawing showing positioning of the reading element by write-once center offset correction subsequent to FIG. 11.

FIG. 12 is an explanatory drawing showing positioning of the reading element by write-once center offset correction, which is carried out subsequent to the write/read offset correction of FIG. 11. In FIG. 12, after the reading element 72 is moved to the track center 80 by the write/read offset correction 90 in the manner of FIG. 11, the second offset correcting unit 50 of FIGS. 1A and 1B reads the write-once center offset β corresponding to the target track, that is, the target cylinder address from the control table 54 and moves the reading head toward the outer direction by the amount corresponding to β shown by a write-once center offset 82, thereby positioning the head to the track center 80, which is the center of the track pitch Tp. When the reading element 72 is positioned at the track center 80 in this manner, as shown by the signal amplitude distribution 84 below, a reproduction signal which is at the peak position 88 of the signal amplitude and has signal amplitude having a highest level, that is, a highest SN ratio can be obtained from the reading element 72. The write-once center offset β for subjecting the head to the offset correction from the write center 78 to the track center 80 like FIG. 12 can be calculated by a calculation equation from the schematic configuration of the head of FIG. 10.

In FIG. 10, the write-once center offset 82 is the amount of positional deviation between the write center 78 and the write-once track center 80, and this has the value half of the width of the adjacent track overwriting part 98, which is obtained by subtracting the effective track width 96 from the recording width 92 (Twc−Tp). Therefore, the value β of the write-once center offset 82 can be provided by the next equation.

$$\beta = \frac{Tw \cdot \cos\theta - Tp}{2} \qquad (4)$$

The element recording width Tw and the track pitch Tp in this equation (4) uses design parameters which are used upon designing and manufacturing of the write-once type storage apparatus of the present embodiment. Other than calculating the write-once track offset β by the calculating equation of the equation (4) in this manner, the write-once center offset β can be obtained by: causing the reading head to move and scan in the transverse direction of the track after track recording as shown in FIG. 9; generating the signal amplitude distribution 84 or the error rate distribution 85 of the reproduction signal as evaluation values; and measuring the write-once center offset β, which represents the deviation amount of the track center 80 with respect to the write center 78, from the peak position 88 in the case of the signal amplitude distribution 84 of the track recording width Twc or the position of the minimum error rate 89 in the case of the error rate distribution 85.

Figure 13:
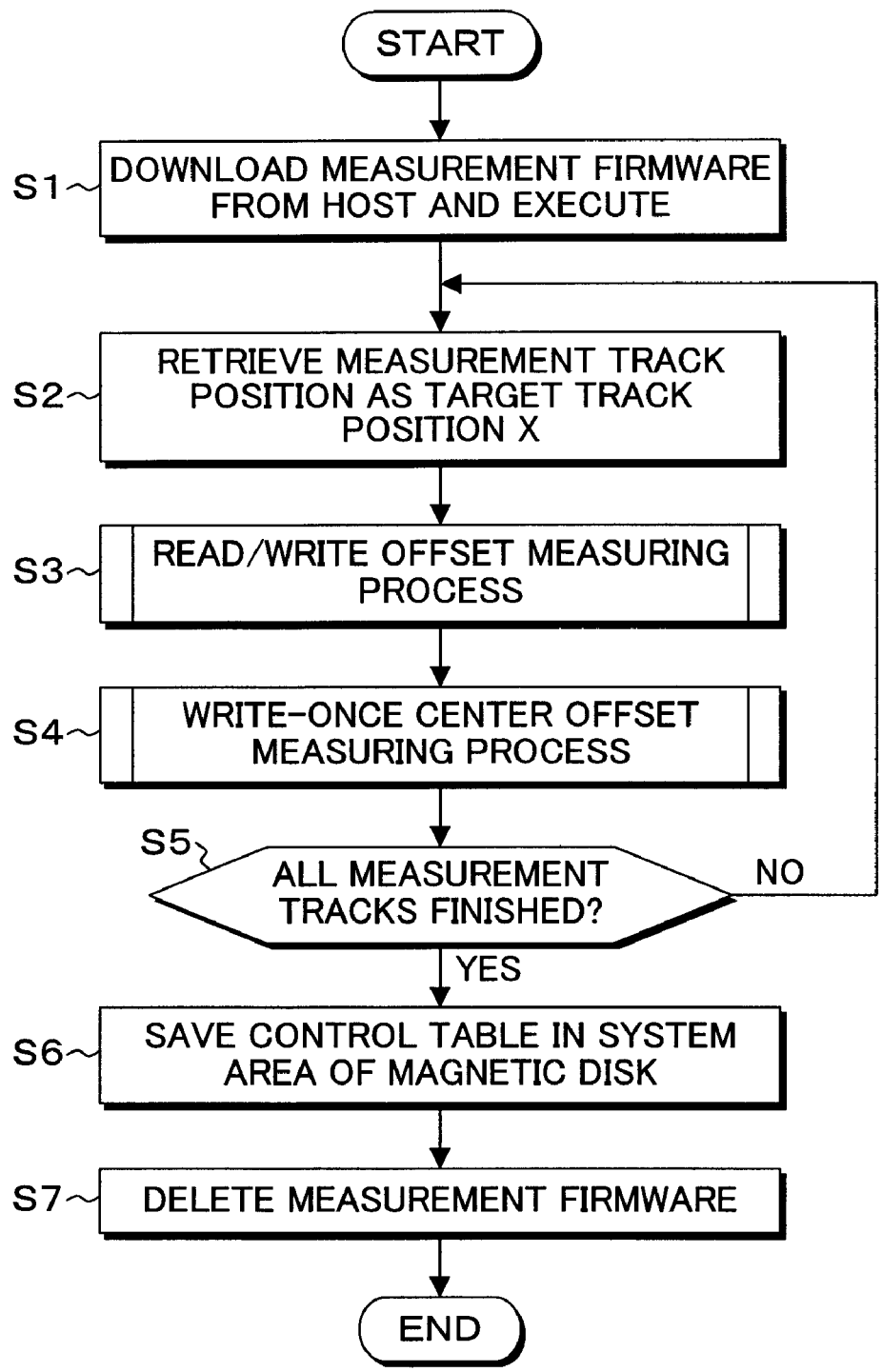
FIG. 13 is a flow chart showing a processing procedure of offset measurement according to the present embodiment.

FIG. 13 is a flow chart showing a processing procedure of offset measurement in the present embodiment, which will be explained below with reference to FIGS. 1A and 1B. In FIG. 13, the measurement firmware is downloaded from the host 11, which is used as the test equipment at step S1, to the memory 30 of the write-once type storage apparatus 10 and executed by the MPU 26. As a result, the functions of the write/read offset measuring unit 45, the write-once center offset measuring unit 46, the recording processing unit 48, the first offset correcting unit 49, the second offset correcting unit 50, and the reproduction processing unit 52 provided in the MPU 26 are enabled. In addition, the control table 54 is prepared in the memory 30. Next, at step S2, a measurement track position is retrieved as a target track position X. Specifically, a head number and a cylinder address are sequentially retrieved from the control table 54 disposed in the memory 30. At this point, merely the head numbers and the cylinder addresses shown in FIG. 3 are set in the control table 54, and offsets therein are unused areas. Next, at step S3, in the state in which the head 22 is caused to seek and placed on the track at a target track position X by the read/write offset measuring unit 45, the signal amplitude distribution or the error rate distribution is obtained while sequentially shifting the reproduction position in the range of a predetermined offset −P to +P, which is centered at the on-track position, the amount of the positional deviation with respect to the peak position in the case of the signal amplitude distribution or the minimum error rate position in the case of the error rate distribution is measured as the write/read offset α and set in the control table 54. Next, at step S4, the write-once center offset β is calculated from the yaw angle θ at the moment by the above described equation (4) by the write-once center offset measuring unit 46. Alternatively, as well as the case of the write/read offset measuring process, in the state in which the head is positioned at the target track, the signal amplitude distribution or the error rate distribution of the reproduction signal is obtained while causing the head to scan in the range of the predetermined offset −P to +P, which is centered thereat, and setting is carried out so that the peak value thereof or the minimum error rate thereof can be obtained. Subsequently, at step S5, whether measurement of all measurement tracks has been finished is checked. If unfinished, the process returns to step S2, a next measurement track is retrieved as the target track X, and a similar process is repeated. If process finish of all the measurement tracks is determined at step S5, the control table 54 is saved in the system area of the magnetic disk at step S6. Note that, if the non-volatile memory 32 has an enough capacity, the control table 54 may be saved in the non-volatile memory 32. Subsequently, at step S7, the measurement firmware corresponding to the write/read offset measuring unit 45 and the write-once center offset measuring unit 46, which is unnecessary since the offset measurement is finished, is deleted from the memory 30, and the offset measuring process is finished. Note that, without carrying out the deletion of the measurement firmware at step S7, the write-once type storage apparatus 10 can be delivered to a user in the state that the measurement firmware is kept being saved in the magnetic disk. In such a case, when failure due to the offset correction occurs in the state in which the user is using the write-once type storage apparatus 10, the control table 54 storing offsets can be created again in the user side by executing the installed measurement firmware.

Figure 14:
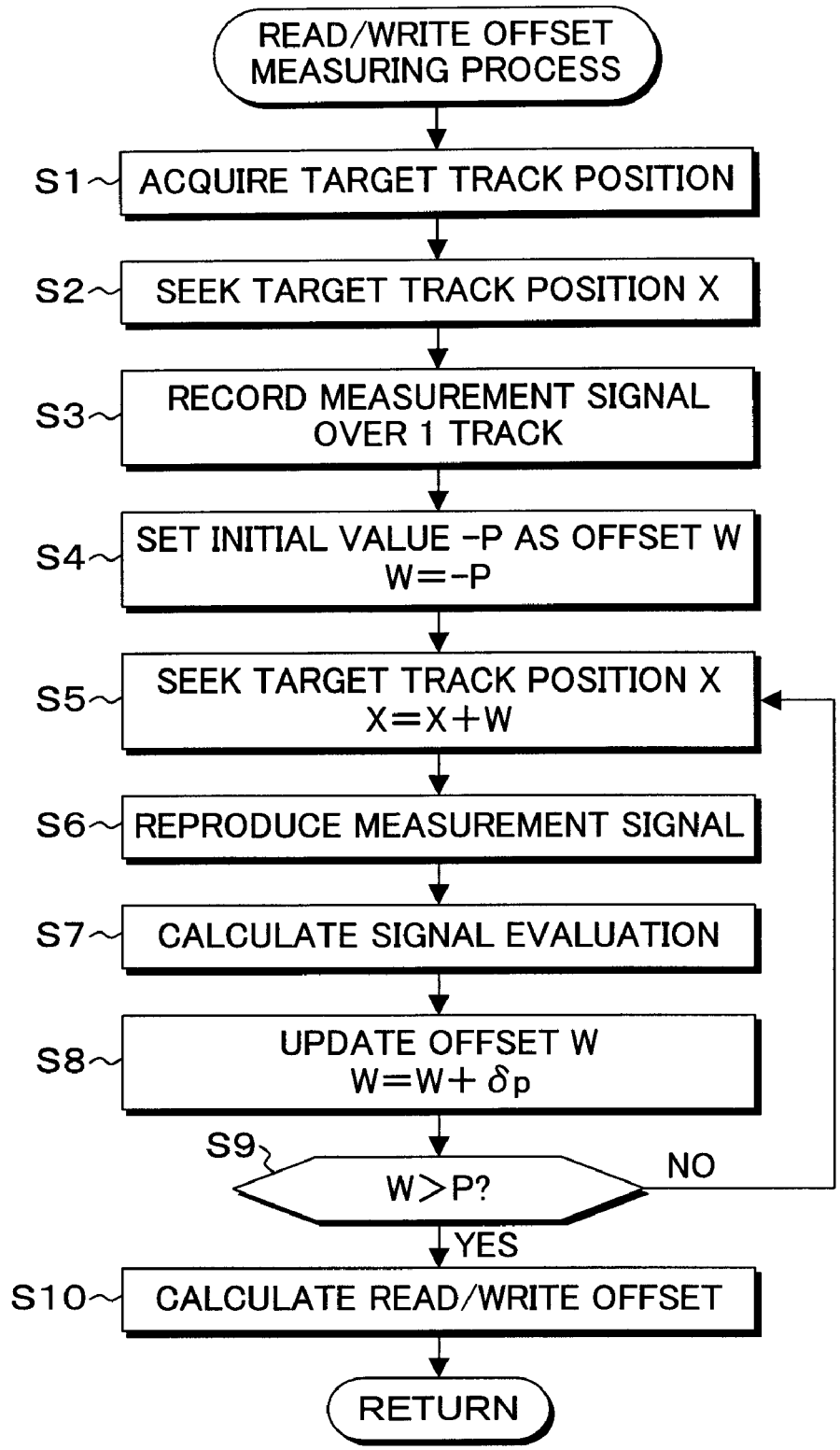
FIG. 14 is a flow chart showing details of a write/read offset measuring process at step S3 of FIG. 13.

FIG. 14 is an explanatory drawing showing details of the write/read offset process at step S3 of FIG. 13. In FIG. 14, in the write/read offset measuring process, the target track position X is obtained at step S1, the target track position X is sought at step S2, and then a measurement signal is recorded over one track at step S3. Subsequently, at step S4, an offset W is set to an initial value −P. Subsequently, the target track position X is sought at step S5, and measurement signal reproduction is started at step S6. Subsequently, at step S7, a signal amplitude value or an error rate is calculated as an evaluation value from the measurement signal, which is obtained for the one track. An average value or an integrated value of the reproduction signal amplitude values, which are sampled for the one track, is used as the signal amplitude value. Subsequently, at step S8, the offset W is increased by δp, which provides a predetermined deviation amount, and updated. Subsequently, at step S9, whether the offset W has reached +P which is a limit of the outer side of the scanning range is determined. If unreached, the process returns to step S5, the target track position X which is shifted by δp is sought, and similar reproduction of the measurement signal and calculation of the evaluation value are repeated. When the offset W has reached +P which is the limit of the outer side of the scanning range, the process proceeds to step S10, and the write/read offset α is detected from the signal amplitude distribution or the error rate distribution, which is the signal evaluation values obtained at step S7. More specifically, in the case of the signal amplitude distribution, the amount of the positional deviation with respect to the target track position X from the position at which the signal amplitude peak value is obtained is detected as the write/read offset α. In the case of the error rate distribution, the amount of the positional deviation from the target track position X to the position at which the minimum error rate is obtained is detected as the write/read offset α.

Figure 15:
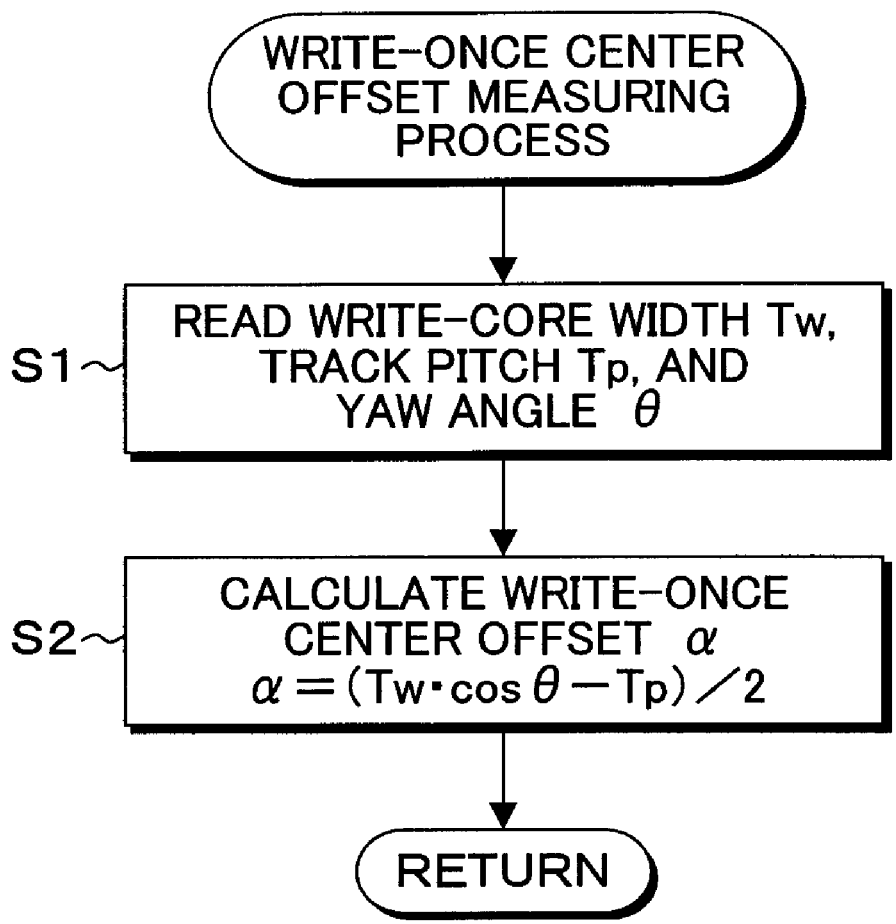
FIG. 15 is a flow chart showing details of a write-once center offset measuring process at step S4 of FIG. 13.

FIG. 15 is a flow chart showing details of the write-once center offset measuring process at step S4 of FIG. 13, wherein the case in which the write-once center offset is calculated by a calculating equation is taken as an example in the present embodiment. In the write-once center offset measuring process of FIG. 15, at step S1, the write core width Tw and the track pitch Tp are read as the constants based on the design parameters, and, at the same time, the yaw angle θ at the target track position X is read. Subsequently, at step S2, the write-once center offset β is calculated in accordance with the above described equation (4).

Figure 16:
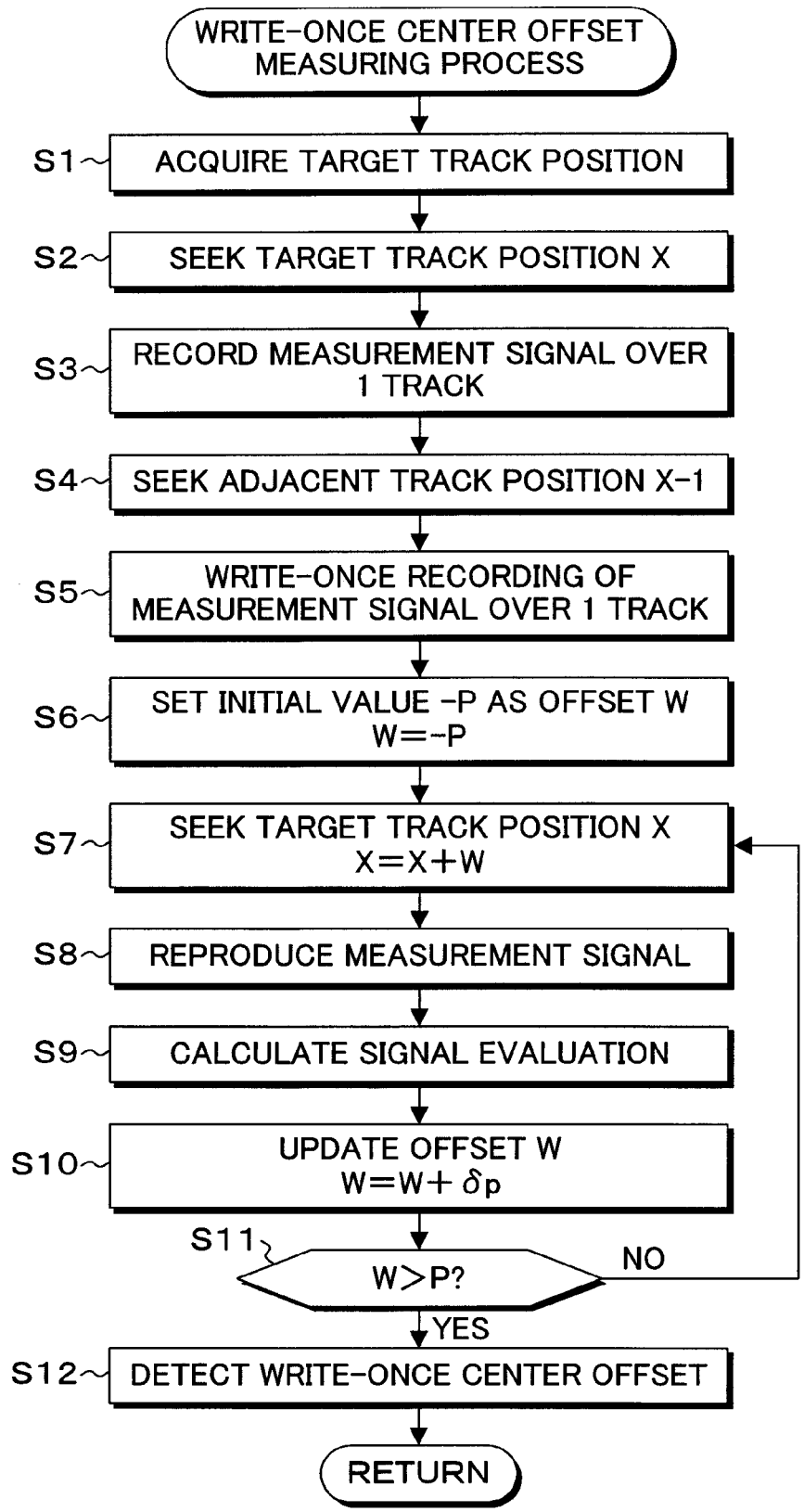
FIG. 16 is a flow chart showing another embodiment of the write-once center offset measuring process at step S4 of FIG. 13.

FIG. 16 is a flow chart showing another embodiment of the write-once center offset measuring process at step S4 of FIG. 13, wherein the case is taken as an example that a reproduction signal is obtained while causing the head at the target track position to move and scan a track little by little in the transverse direction thereof, that the signal amplitude distribution or the error rate distribution is obtained, and that the write-once center offset β is detected therefrom.

In FIG. 16, in the write-once center offset measuring process, the target track position X is obtained at step S1, the target track position X is sought at step S2, and a measurement signal is recorded over one track at step S3. Subsequently, an adjacent track position (X-1) that is shifted therefrom by the track pitch Tp is sought at step S4, and a measurement signal is write-once recorded at the adjacent track position over one track at step S5. Through the recording process at steps S1 to S5, after carrying out the recording by the recording width Twc as shown in the track 62-11 of FIG. 9, the write-once recording state in which the track pitch Tp can be achieved by the write-once recording of the adjacent track 62-12 is made. Subsequently, the offset W is set to −P which represents the inner side limit of the scanning range of the head at step S6, then the head is caused to seek the target track position X which is the offset W added to the target track X at step S7, the measurement signal recorded on the magnetic disk is reproduced at step S8, and the signal amplitude value or the error rate of the reproduction signal is calculated as an evaluation value at step S9. In this case, an average value or an integrated value of the sampling values of the one track is used as the signal amplitude. Subsequently, update of increasing the offset W by δp, which determines a predetermined deviation amount of the scanning range, is carried out at step S10. Then, whether the offset has reached +P, which represents the outer side limit of the scanning range, is checked at step S11. If it has not reached +P, the process returns to step S7, the position which is obtained by adding the offset W updated at step S10, to the target track position X is sought, and similar reproduction of the measurement signal and calculation of the signal amplitude value or the error rate serving as the signal evaluation is carried out. When it is determined at step S11 that the offset W has reached +P which represents the outer side limit of the scanning range, the process proceeds to step S12, and the write-once center offset β is detected from the signal amplitude distribution or the error rate distribution of the measurement signal obtained by the scanning of the range of −P to +P. Herein, the recording of the measurement signal sought the target position X at steps S2 and S3 in the write-once center offset measurement of FIG. 16 is the same as the recording process at steps S2 and S3 of the write/read offset measuring process shown in FIG. 14. Therefore, when the recording result of the write/read offset measuring process of FIG. 14 is utilized without change, the processes at steps S2 and S3 of FIG. 16 can be omitted.

FIGS. 17A and 17B are explanatory drawings showing another embodiment of the write-once center offset measuring process using a plurality of reading elements. FIG. 17A shows the head 22 used in the present embodiment, and three reading elements 100, 102, and 104 are provided for the recording element 70 in the head 22. Herein, the reading element 102 is disposed so as to meet the center line of the recording element 70. However, the reading element 100 is disposed so as to be shifted from the center reading element 102 by a predetermined offset β1 toward the inner side, and reversely, the reading element 104 is disposed so as to be shifted by a predetermined offset β2 toward the outer side. The offsets β1 and β2 of the reading elements 100 and 104 with respect to the center reading element 102 are mutually slightly different values.

FIG. 17B shows a process of positioning the head 22 of FIG. 17A at a target track in the outer side and measuring the write-once center offset. In this positioning of the head 22, positioning is carried out by reading the servo information by the center reading element, and the write/read offset correction has been carried out in this state. Therefore, the center reading element 102 is positioned at a write center 78-2 which is the center of the recording width of the track 62-12. At this time, since the reading element 104 positioned in the outer side of the reading element 102 is disposed at the position shifted therefrom by the offset β2, the reading element 104 is in the state that it is positioned at a write center 80-2 which is the center of the track pitch Tp. Therefore, the write-once center offset β of this moment, which is the deviation amount of the track center 80-2 from the write center 78-2 of the track 62-12, can be set as β2, which is the deviation amount of the reading element 104 from the reading element 102 in the head 22.

Figure 18:
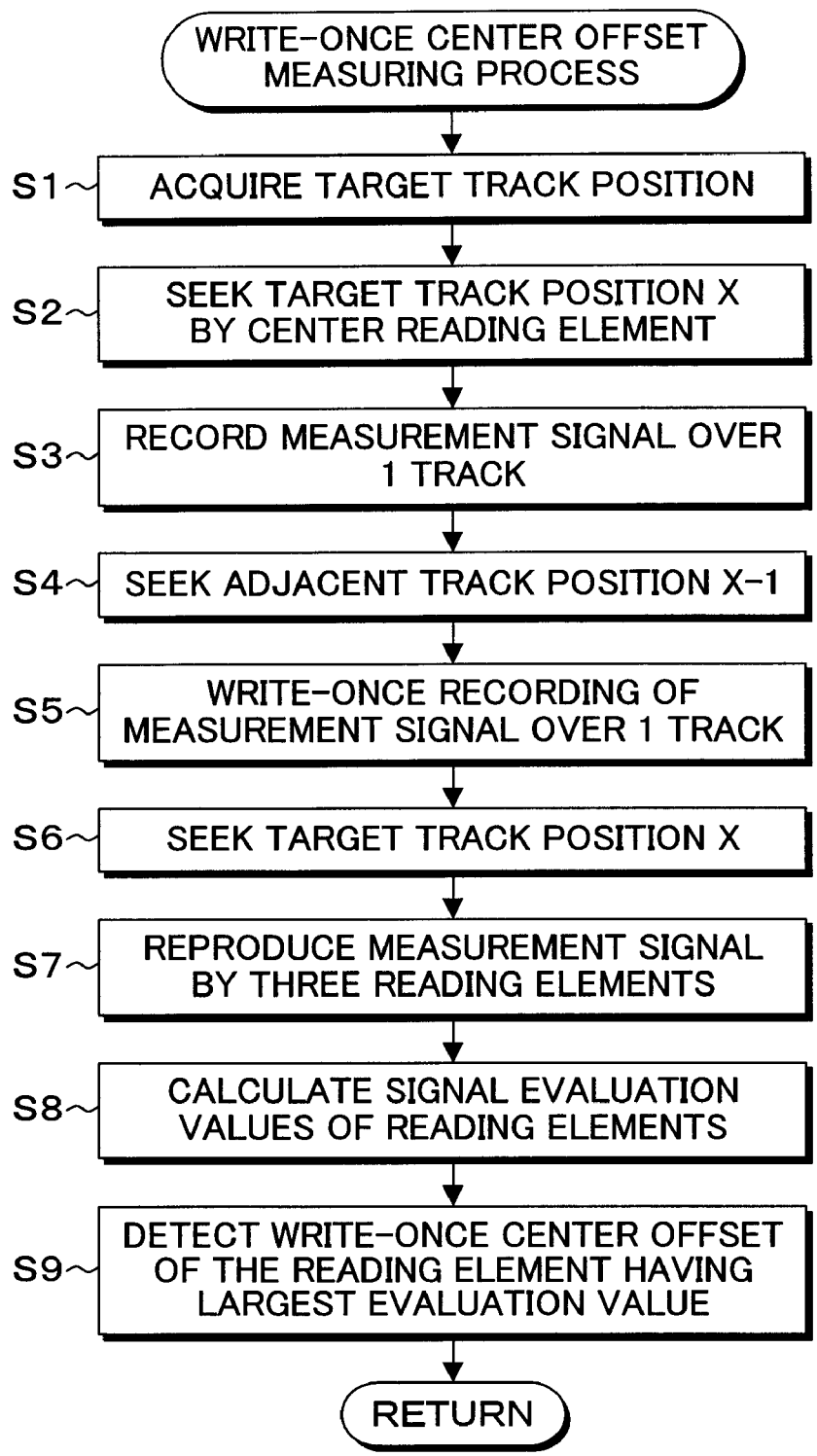
FIG. 18 is a flow chart showing details of the write-once center offset measuring process using the plurality of reading elements.

FIG. 18 is a flow chart showing details of the write-once center offset measuring process using the plurality of reading elements shown in FIGS. 17A and 17B. In FIG. 18, in the write-once center offset measuring process, the target track position X is obtained at step S1, positioning is carried out by seeking the target track position X by the center reading element at step S2, and then a measurement signal is recorded over one track at step S3. Subsequently, an adjacent track X-1 is sought by shifting by the pitch Tp at step S4. Then, a measurement signal is write-once recorded in the adjacent track over one track at step S5. These processes at steps S1 to S5 are the same as those of the write-once center offset measuring process of FIG. 16. Subsequently, at step S6, positioning is carried out by seeking the target track position X by the center reading element. Then, at step S7, the measurement signal is reproduced by the three reading elements. Subsequently, at step S8, the signal evaluation values of the reading elements such as signal amplitude values or error rates of the reading elements 62 are calculated. At step S9, the offset of the reading element having a maximum evaluation value is detected as the write-once center offset. For example, when the signal amplitude is used as the signal evaluation values, the offset of the reading element at which the signal amplitude is the largest is detected as the write-once center offset. Also, in the case of the error rate, the offset of the reading element at which the error rate is the lowest among the three reading elements is detected as the write-once center offset. In this manner, in the write-once center offset measuring process using the head in which the plurality of reading elements are disposed so that they are arranged in the track direction and mutually and slightly shifted in the transverse direction of the track, the write-once center offset can be uniquely detected by the offsets of the reading elements by specifying the reading element having the highest evaluation value in comparison of the signal amplitude or the error rate through reading of the patterns of the recoding measurement by the plurality of reading elements, and the detecting process of the write-once center offset can be more simply realized.

FIGS. 19A and 19B are explanatory drawings showing another embodiment of the write-once center offset measuring process using a plurality of reading elements. FIG. 19A shows the head 22 used in the present embodiment. In the present embodiment, a reading element 108 is disposed so as to meet the center line of the recording element 70, and, in both sides of the reading element 108, reading elements 106 and 110 are disposed respectively with the positional deviation amounts which are predetermined mutually-different offsets β1 and β2 added to the track pitch Tp.

FIG. 19B shows the state in which write/read offset correction is carried out in the state in which the head 22 of FIG. 19A is positioned by seeking the track 62-12 of the magnetic disk 20 by using the center reading element 108; therefore, the reading element 108 is positioned at a write center 78-12 of the track 62-12. At this time, the reading element 106 in the inner side is positioned at a write center 78-3 of the adjacent track 62-13. On the other hand, the reading element 110 in the outer side is positioned at a write center 80-1 of the adjacent track 62-11. Therefore, among the three reading elements 106, 108, and 110, the one having, for example, the largest signal amplitude of the measurement signal is the reading element 110 in the outer side which is positioned at the track center 80-1. Therefore, in this case, the offset β which is obtained by subtracting the track pitch Tp from the distance (T+β2) of the reading element 110 in the outer side can be detected as the write-once center offset of the track 62-12. The write-once center offset measuring process using the plurality of reading elements shown in FIGS. 19A and 19B are the same as the flow chart of FIG. 18. In the embodiment of FIGS. 17A and 17B or FIGS. 19A and 19B, the case in which three reading heads are disposed so that they are mutually shifted by distances in the track direction or in the transverse direction of the tracks has been taken as an example. However, three or more arbitrary plurality number of the reading heads may be disposed therein. As a normal reproduction process after the offset measurement of the embodiment shown in FIGS. 17A and 17B or FIGS. 19A and 19B provided with the three reading heads, the center reading head 102 or 108 provided at the same position as the recording element 70 is selected to carry out a reproduction process. Note that, in the above described embodiments, the write-once recording of sequentially writing data from the track at which the yaw angle is the largest toward the track having the yaw angle of 0 is taken as an example. However, other than this continuous recording, the embodiments can be also applied without change to write-once recording by random recording in which recording is carried out from a track having a large yaw angle toward the direction of the adjacent tracks having smaller yaw angles. The above described embodiments takes the write-once recording of the hard disk drive using magnetic disks as recording media as an example. However, the embodiments can be applied without change to an arbitrary storage apparatus as long as the storage apparatus uses a rotary actuator wherein the yaw angle is generated upon positioning of a head with respect to a disk medium. Moreover, the present invention includes arbitrary modifications that do not impair objects and advantages thereof, and the present invention is not limited by the numerical values shown in the above described embodiments.

The invention claimed is:

1. A write-once type storage apparatus which supports a head having a recording element and a reading element at a distal end of a rotary actuator and reproduces information after once continuously writing the information to a disk medium by the recording element; the write-once type storage apparatus comprising:
   a recording processing unit, when write to an unused track adjacent to a recorded track is to be carried out, setting a track pitch narrower than a writing width of the recording element so that part of the recorded track overlapped with the unused track is overwritten and continuously recording the information on the disk medium toward one direction along with the track pitch;
   a first offset correcting unit reading a write/read offset from a storage table set in advance and correcting the write/read offset in the state that the reading element is positioned at a target track, the write/read offset being positional deviation between the recording element and the reading element;
   a second offset correcting unit correcting a write-once center offset, the write-once center offset being positional deviation between a read center of the reading element, which has undergone correction of the write/read offset by the first offset correcting unit, and an effective track width center of the write-once recording; and
   a reproduction processing unit reproducing the information of the disk medium by the reading element in the state that the write/read offset and the write-once center offset are corrected.

2. The write-once type storage apparatus according to claim 1, wherein the second offset correcting unit obtains the write-once center offset β as $$\beta = \frac{Tw \cdot \cos\theta - Tp}{2}$$

based on a yaw angle θ of the rotary actuator corresponding to a position of the target track, a head recording width Tw of the recording element, and the track pitch Tp of the write-once recording and corrects the write-once center offset β.

3. The write-once type storage apparatus according to claim 1, wherein the write-once center offset β is obtained as $$\beta = \frac{Tw \cdot \cos\theta - Tp}{2}$$

based on an yaw angle θ of the rotary actuator corresponding to a position of the target track, a head recording width Tw of the recording element, and the track pitch Tp of the write-once recording, the write-once center offset β is set in advance in the storage table, the second offset correcting unit reads the write-once center offset β corresponding to the target track position from the storage table and corrects the write-once center offset β.

4. The write-once type storage apparatus according to claim 1, further comprising an offset measuring unit measuring the write-once center offset at every track position and setting the write-once center offset in the storage table.

5. The write-once type storage apparatus according to claim 4, wherein
   the offset measuring unit comprises:
   a measurement data recording unit positioning the head at a target track and recording measurement information on the disk medium by the recording element;
   a measurement data reproducing unit reading the measurement information from the storage medium while scanning a predetermined scanning range by the head, the scanning range including a recording starting position of the head and ranged from an inner circumferential side to an outer circumferential side; and
   an offset detecting unit obtaining distribution of evaluation values in the predetermined scanning range from a measurement data read signal obtained by the measurement data reproducing unit and detecting the write-once center offset from the distribution of the evaluation values.

6. The write-once type storage apparatus according to claim 5, wherein the offset detecting unit detects amplitude of the read signal, which is obtained by the measurement data reproducing unit, as the evaluation values and detects the write-once center offset from a peak value of the distribution of the amplitude.

7. The write-once type storage apparatus according to claim 5, wherein the offset detecting unit detects an error rate of the read signal, which is obtained by the measurement data reproducing unit, as the evaluation values and detects the write-once center offset from a bottom peak value of the distribution of the error rate.

8. The write-once type storage apparatus according to claim 4, wherein the head has a plurality of reading elements arranged around a positioning reading element in a track direction, the reading elements being disposed so as to be mutually shifted in a transverse direction of the track by predetermined mutually different deviation amounts;
   the offset measuring unit comprises:
   a measurement data recording unit positioning the head at a target track by using one of the plurality of reading elements as the positioning reading element and recording measurement information on the disk medium by the recording element;
   a measurement data reproducing unit reading the measurement data from the storage medium by the reading elements in the state that the head is positioned at the target track position by the positioning reading element;
   the offset detecting unit detecting the amount of positional deviation of the reading element having a peak amplitude value or a minimum error rate value among measurement data read signals of the plurality of reading elements obtained by the measurement data reproducing unit, the positional deviation being with respect to the positioning reading element and detected as the write-once center offset.

9. The write-once type storage apparatus according to claim 4, wherein the head has a plurality of reading elements arranged around a positioning reading element in a transverse direction of tracks in both sides, the reading elements being disposed respectively at intervals obtained by adding predetermined mutually different deviation amounts to the interval of the track pitch;
the offset measuring unit comprises:
a measurement data recording unit positioning the head at a target track by using one of the plurality of reading elements as the positioning reading element and recording measurement information on the disk medium by the recording element;
a measurement data reproducing unit reading the measurement information from the storage medium by the reading elements in the state that the head is positioned at the target track position by the positioning reading element; and
an offset detecting unit detecting the amount of positional deviation of the reading element having a peak amplitude value or a minimum error rate value among measurement data read signals of the plurality of reading elements obtained by the measurement data reproducing unit, the positional deviation being with respect to the positioning reading element and detected as the write-once center offset.

10. A control circuit of a write-once type storage apparatus which supports a head having a recording element and a reading element at a distal end of a rotary actuator and reproduces information after once continuously writing the information to a disk medium by the recording element; the control circuit of the write-once type storage apparatus comprising:
a recording processing unit, when write to an unused track adjacent to a recorded track is to be carried out, setting a track pitch narrower than a writing width of the recording element so that part of the recorded track overlapped with the unused track is overwritten and continuously recording the information on the disk medium toward one direction along with the track pitch;
a first offset correcting unit reading a write/read offset from a storage table, which has measured and saved the write/read offset in advance, and correcting the write/read offset in the state that the reading element is positioned at a target track, the write/read offset being positional deviation between the recording element and the reading element;
a second offset correcting unit correcting a write-once center offset, the write-once center offset being positional deviation between a read center of the reading element, which has undergone correction of the write/read offset by the first offset correcting unit, and an effective track width center of the write-once recording; and
a reproduction processing unit reproducing the information of the disk medium by the reading element in the state that the write/read offset and the write-once center offset are corrected.

11. The control circuit of the write-once type storage apparatus according to claim 10, wherein the second offset correcting unit obtains the write-once center offset $\beta$ as $$\beta = \frac{Tw \cdot \cos\theta - Tp}{2}$$

based on a yaw angle $\theta$ of the rotary actuator corresponding to a position of the target track, a head recording width Tw of the recording element, and the track pitch Tp of the write-once recording and corrects the write-once center offset $\beta$.

12. The control circuit of the write-once type storage apparatus according to claim 10, wherein the write-once center offset $\beta$ is obtained as $$\beta = \frac{Tw \cdot \cos\theta - Tp}{2}$$

based on an yaw angle $\theta$ of the rotary actuator corresponding to a position of the target track, a head recording width Tw of the recording element, and the track pitch Tp of the write-once recording, the write-once center offset $\beta$ is set in advance in the storage table, the second offset correcting unit reads the write-once center offset $\beta$ corresponding to the target track position from the storage table and corrects the write-once center offset $\beta$.

13. The control circuit of the write-once type storage apparatus according to claim 10, further comprising an offset measuring unit measuring the write-once center offset at every track position and setting the write-once center offset in the storage table.

14. The control circuit of the write-once type storage apparatus according to claim 13, wherein
the offset measuring unit comprises:
a measurement data recording unit positioning the head at a target track and recording measurement information on the disk medium by the recording element;
a measurement data reproducing unit reading the measurement information from the storage medium while scanning a predetermined scanning range by the head, the scanning range including a recording starting position of the head and ranged from an inner circumferential side to an outer circumferential side; and
an offset detecting unit obtaining distribution of evaluation values in the predetermined scanning range from a measurement data read signal obtained by the measurement data reproducing unit and detecting the write-once center offset from the distribution of the evaluation values.

15. The control circuit of the write-once type storage apparatus according to claim 14, wherein the offset detecting unit detects amplitude of the read signal, which is obtained by the measurement data reproducing unit, as the evaluation values and detects the write-once center offset from a peak value of the distribution of the amplitude.

16. The control circuit of the write-once type storage apparatus according to claim 14, wherein the offset detecting unit detects an error rate of the read signal, which is obtained by the measurement data reproducing unit, as the evaluation values and detects the write-once center offset from a bottom peak value of the distribution of the error rate.

17. The control circuit of the write-once type storage apparatus according to claim 10, wherein the head has a plurality of reading elements arranged around a positioning reading element in a track direction, the reading elements being disposed so as to be mutually shifted in a transverse direction of the track by predetermined mutually different deviation amounts;
the offset measuring unit comprises:
a measurement data recording unit positioning the head at a target track by using one of the plurality of reading elements as the positioning reading element and recording measurement information on the disk medium by the recording element;

a measurement data reproducing unit reading the measurement data from the storage medium by the reading elements in the state that the head is positioned at the target track position by the positioning reading element; and the offset detecting unit detecting the amount of positional deviation of the reading element having a peak amplitude value or a minimum error rate value among measurement data read signals of the plurality of reading elements obtained by the measurement data reproducing unit, the positional deviation being with respect to the positioning reading element and detected as the write-once center offset.

18. The control circuit of the write-once type storage apparatus according to claim 10, wherein the head has a plurality of reading elements arranged around a positioning reading element in a transverse direction of tracks in both sides, the reading elements being disposed respectively at intervals obtained by adding predetermined mutually different deviation amounts to the interval of the track pitch;

the offset measuring unit comprises:

a measurement data recording unit positioning the head at a target track by using one of the plurality of reading elements as the positioning reading element and recording measurement information on the disk medium by the recording element;

a measurement data reproducing unit reading the measurement information from the storage medium by the reading elements in the state that the head is positioned at the target track position by the positioning reading element; and an offset detecting unit detecting the amount of positional deviation of the reading element having a peak amplitude value or a minimum error rate value among measurement data read signals of the plurality of reading elements obtained by the measurement data reproducing unit, the positional deviation being with respect to the positioning reading element and detected as the write-once center offset.

19. A control method of a write-once type storage apparatus which supports a head having a recording element and a reading element at a distal end of a rotary actuator and reproduces information after once continuously writing the information to a disk medium by the recording element; the write-once type storage apparatus comprising:

a recording process of, when write to an unused track adjacent to a recorded track is to be carried out, setting a track pitch narrower than a writing width of the recording element so that part of the recorded track overlapped with the unused track is overwritten and continuously recording the information on the disk medium toward one direction along with the track pitch;

a first offset correcting process of reading a write/read offset from a storage table set in advance and correcting the write/read offset in the state that the reading element is positioned at a target track, the write/read offset being positional deviation between the recording element and the reading element;

a second offset correcting process of correcting a write-once center offset, the write-once center offset being positional deviation between a read center of the reading element, which has undergone correction of the write/read offset by the first offset correcting process, and an effective track width center of the write-once recording; and a reproduction process of reproducing the information of the disk medium by the reading element in the state that the write/read offset and the write-once center offset are corrected.

20. The control method of the write-once type storage apparatus according to claim 19, wherein the second offset correcting process obtains the write-once center offset $\beta$ as $$\beta = \frac{Tw \cdot \cos\theta - Tp}{2}$$

based on a yaw angle $\theta$ of the rotary actuator corresponding to a position of the target track, a head recording width Tw of the recording element, and the track pitch Tp of the write-once recording and corrects the write-once center offset $\beta$.

* * * * *